(12) United States Patent
Nakano

(10) Patent No.: US 11,941,476 B2
(45) Date of Patent: Mar. 26, 2024

(54) CONTACTLESS COMMUNICATION MEDIUM AND METHOD FOR PRODUCING CONTACTLESS COMMUNICATION MEDIUM

(71) Applicant: SONY GROUP CORPORATION, Tokyo (JP)

(72) Inventor: Aki Nakano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/638,279

(22) PCT Filed: Jul. 20, 2020

(86) PCT No.: PCT/JP2020/028006
§ 371 (c)(1),
(2) Date: Feb. 25, 2022

(87) PCT Pub. No.: WO2021/044748
PCT Pub. Date: Mar. 11, 2021

(65) Prior Publication Data
US 2022/0327296 A1 Oct. 13, 2022

(30) Foreign Application Priority Data

Sep. 5, 2019 (JP) .................. 2019-161844

(51) Int. Cl.
*G06K 7/10* (2006.01)
*B32B 3/30* (2006.01)
(Continued)

(52) U.S. Cl.
CPC ............ *G06K 7/10297* (2013.01); *B32B 3/30* (2013.01); *B32B 27/308* (2013.01);
(Continued)

(58) Field of Classification Search
CPC ........ G06K 7/10297; G06K 7/00; B32B 3/30; B32B 27/308; B32B 27/365
(Continued)

(56) References Cited

U.S. PATENT DOCUMENTS

2009/0235037 A1* 9/2009 Mounier ............... G07F 7/1008
711/E12.001

FOREIGN PATENT DOCUMENTS

| JP | 2000-067193 A | 3/2000 |
| JP | 2000-207519 A | 7/2000 |

(Continued)

OTHER PUBLICATIONS

International Search Report and Written Opinion of PCT Application No. PCT/JP2020/028006, dated Oct. 20, 2020, 09 pages of ISRWO.

*Primary Examiner* — Edwyn Labaze
(74) *Attorney, Agent, or Firm* — CHIP LAW GROUP

(57) ABSTRACT

A contactless communication medium according to an embodiment of the present technology includes an IC module, a first member, a second member, and a print layer. The IC module is capable of performing a contactless communication. The first member is made of a first transparent resin material, the first member including a first surface and a second surface, the first surface being a surface in which a concave portion that accommodates therein the IC module is formed, the second surface being situated opposite to the first surface. The second member is made of a second transparent resin material, the second member being connected to the first surface or the second surface. The print layer is arranged between the first member and the second member.

19 Claims, 13 Drawing Sheets

(51) Int. Cl.
   *B32B 27/30* (2006.01)
   *B32B 27/36* (2006.01)
   *A47G 29/10* (2006.01)

(52) U.S. Cl.
   CPC ............ *B32B 27/365* (2013.01); *A47G 29/10* (2013.01); *B32B 2307/412* (2013.01); *B32B 2519/02* (2013.01)

(58) Field of Classification Search
   USPC ................................ 235/451, 439, 435, 375
   See application file for complete search history.

(56) References Cited

FOREIGN PATENT DOCUMENTS

| | | | |
|---|---|---|---|
| JP | 2000-280665 A | | 10/2000 |
| JP | 2004356133 A | * | 12/2004 |
| JP | 2014-024235 A | | 2/2014 |
| JP | 2014-085997 A | | 5/2014 |
| JP | 2014-096125 A | | 5/2014 |
| JP | 2018-034326 A | | 3/2018 |

* cited by examiner

CONTACTLESS COMMUNICATION MEDIUM AND METHOD FOR PRODUCING CONTACTLESS COMMUNICATION MEDIUM

CROSS REFERENCE TO RELATED APPLICATIONS

This application is a U.S. National Phase of International Patent Application No. PCT/JP2020/028006 filed on Jul. 20, 2020, which claims priority benefit of Japanese Patent Application No. JP 201 9-1 61 844 filed in the Japan Patent Office on Sep. 5, 2019. Each of the above-referenced applications is hereby incorporated herein by reference in its entirety.

TECHNICAL FIELD

The present technology relates to a contactless communication medium and a method for producing the contactless communication medium.

BACKGROUND ART

Patent Literature 1 discloses a card body that includes an integrated circuit (IC) chip. The card body is molded using a colorless transparent material as a raw material, and a pattern and coloring paint are printed on the card body. Consequently, production costs can be reduced by using the same resin raw material and the same metal mold, even if the number of card bodies produced for each color is small. Further, identification can be performed from the front surface and the back surface of the transparent card body since a pattern is displayed on the transparent card body. This results in being able to improve the recognition performance, the identification performance, and the convenience (paragraphs [0029] and [0043] and FIGS. 2A and 2B of Patent Literature 1).

CITATION LIST

Patent Literature

CITATION LIST

Patent Literature

Patent Literature 1: Japanese Patent Application Laid-open No. 2000-280665

DISCLOSURE OF INVENTION

Technical Problem

There is a need for a technology that makes it possible to improve a design quality of such a contactless communication medium including an IC chip.

In view of the circumstances described above, it is an object of the present technology to provide a contactless communication medium and a method for producing the contactless communication medium that make it possible to easily provide a contactless communication medium with a high design quality.

Solution to Problem

In order to achieve the object described above, a contactless communication medium according to an embodiment of the present technology includes an IC module, a first member, a second member, and a print layer.

The IC module is capable of performing a contactless communication.

The first member is made of a first transparent resin material, the first member including a first surface and a second surface, the first surface being a surface in which a concave portion that accommodates therein the IC module is formed, the second surface being situated opposite to the first surface.

The second member is made of a second transparent resin material, the second member being connected to the first surface or the second surface.

The print layer is arranged between the first member and the second member.

In this contactless communication medium, the IC module used to perform a contactless communication is accommodated in the concave portion formed in the first member. Further, the second member is connected to the first surface or the second surface of the first member, and the print layer is arranged between the first member and the second member. This makes it possible to easily provide a contactless communication medium with a high design quality.

The contactless communication medium may further include a lid member that is arranged to cover the concave portion accommodating therein the IC module.

The lid member may include a plurality of recesses having different shapes.

The first transparent resin material may be an acrylic resin or polycarbonate. In this case, the second transparent resin material may be an acrylic resin or polycarbonate.

The first transparent resin material and the second transparent resin material may be the same material.

The contactless communication medium may have a plate shape having a uniform thickness. In this case, the first member and the second member may be connected to each other in a direction of the thickness.

The first member may include a first separate member and a second separate member, the first separate member being a member in which a through-hole is formed, the second separate member being connected to the first separate member to cover one of openings of the through-hole. In this case, the concave portion may be the through-hole of which the one of the openings is covered.

The contactless communication medium may further includes a lid member that is arranged to cover the concave portion accommodating therein the IC module. In this case, the lid member may be arranged to cover the entirety of the concave portion, as viewed from the direction of the thickness.

The lid member may be arranged such that a surface of the lid member that is situated opposite to the IC module is situated in plane with the first surface of the first member.

The first member and the second member may have the same shape, as viewed from the direction of the thickness.

The print layer may be a layer in which at least one of a character, a word, a picture, a photo, or a figure is printed.

The print layer may have a specified outer shape, as viewed from the direction of the thickness. In this case, the first member and the second member may each have an outer shape based on an outer shape of the print layer, as viewed from the direction of the thickness.

The first member, the second member, the lid member, and the print layer may each be connected to another member using UV bonding, bonding with a double-sided tape, ultrasonic welding, laser welding, or heat welding.

At least one of the first member, the second member, the lid member, or the print layer is connected to the other member using the UV bonding.

The concave portion may be formed on the basis of a specified reference position. In this case, the contactless communication medium may further include a position display member that indicates the reference position.

A method for producing a contactless communication medium according to another embodiment of the present technology includes forming a first member using a first transparent resin material, the first member including a first surface and a second surface, the first surface including a concave portion, the second surface being situated opposite to the first surface;

forming a second member using a second transparent resin material;

accommodating, in the concave portion, an integrated circuit (IC) module used to perform a contactless communication; and connecting the second member to the first surface or the second surface of the first member such that a print layer is arranged between the first member and the second member.

A method for producing a contactless communication medium according to another embodiment of the present technology includes forming a first separate member using a first transparent resin material, the first separate member including a through-hole;

forming a second separate member using the first transparent resin material;

forming a first member by connecting the first separate member and the second separate member to cover one of openings of the through-hole, the first member including a first surface and a second surface, the first surface including a concave portion, the second surface being situated opposite to the first surface;

forming a second member using a second transparent resin material;

accommodating, in the concave portion, an integrated circuit (IC) module used to perform a contactless communication; and connecting the second member to the first surface or the second surface of the first member such that a print layer is arranged between the first member and the second member.

A method for producing a contactless communication medium according to another embodiment of the present technology includes forming a first transparent member using a first transparent resin material, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

A method for producing a contactless communication medium according to another embodiment of the present technology includes forming a first separate member using a first transparent resin material, the first separate member including a plurality of through-holes;

forming a second separate member using the first transparent resin material;

forming a first transparent member by connecting the first separate member and the second separate member to cover respective openings of the plurality of through-holes that are situated on the same side, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

The cutting out the portion including each of the plurality of concave portions such that the portion has the specified shape may be performed by laser processing or cutting processing.

MODE(S) FOR CARRYING OUT THE INVENTION

Embodiments according to the present technology will now be described below with reference to the drawings.

First Embodiment

[Communication System]

Figure 1:
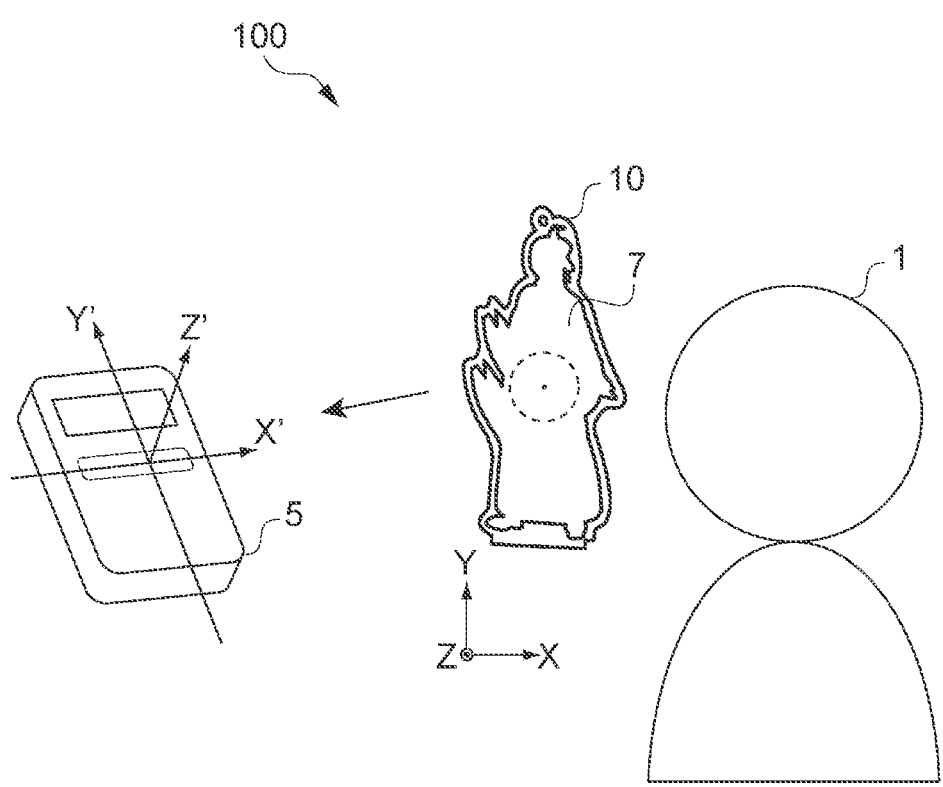
FIG. 1 schematically illustrates an example of a configuration of a communication system according to a first embodiment.

FIG. 1 schematically illustrates an example of a configuration of a communication system according to a first embodiment of the present technology. A communication system 100 includes a reader/writer 5, and an IC key-chain item 10.

The IC key-chain item 10 is a key-chain-item-type communication medium that can be used by a user 1.

An IC module that enables contactless communication is internally provided in the IC key-chain item 10. The IC key-chain item 10 is a communication medium that has the same appearance as, for example, an acrylic key-chain item. Thus, the IC key-chain item 10 has an appearance of a general acrylic key-chain item, and can perform a contactless wireless communication with the reader/writer 5.

In the present embodiment, the use of the IC key-chain item 10 makes it possible to perform communication (hereinafter referred to as an NFC communication) in accordance with near field communication (NFC) that uses an RF carrier frequency of 13.56 MHz and has a communication rate of between 100 Kbps and 900 Kbps.

Examples of a communication system using an NFC communication include FeliCa (registered trademark) (a communication rate of between 212 Kbps and 424 Kbps). Of course, the present technology is not limited to this communication system, and can also be applied to an NFC communication for another communication system. For example, a communication system in accordance with a standard having a communication rate of between 106 Kbps and 848 Kbps may be used.

The reader/writer 5 includes an antenna, and can perform a contactless communication with the IC key-chain item 10. In other words, the reader/writer 5 can perform an NFC communication with the IC key-chain item 10. For example, the user 1 can perform, for example, an electronic money payment by passing the IC key-chain item 10 over the reader/writer 5.

[Configuration of IC Key-Chain Item]

A specific example of a configuration of the IC key-chain item 10 according to the present embodiment is described. The IC key-chain item 10 corresponds to an embodiment of a contactless communication medium according to the present technology.

Figure 2A:
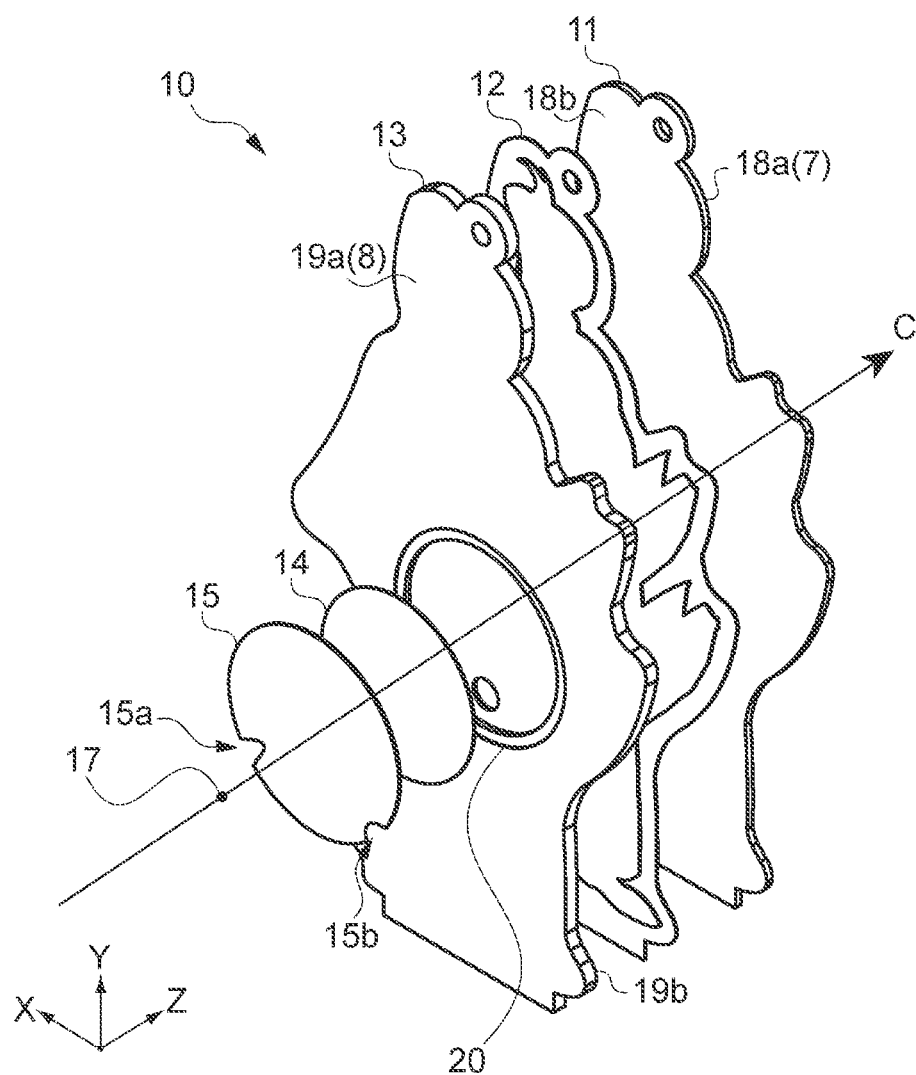
FIGS. 2A and 2B are exploded perspective views illustrating an example of a configuration of an IC key-chain item.
Figure 2B:
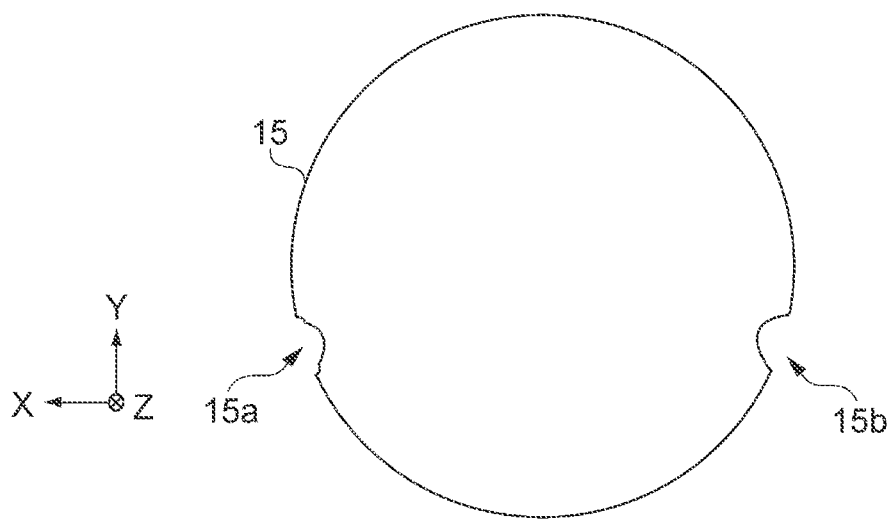

As illustrated in FIG. 1, the IC key-chain item 10 includes a first primary surface 7 that is situated on a front side and on which a character can be seen, and a second primary surface 8 that is situated on a side opposite to the front side (refer to FIGS. 2A and 2B).

In the following description, a direction (a left-and-right direction) that corresponds to the right side and the left side of a character when the first primary surface 7 is viewed from the front is defined as an X direction, and a direction (an up-and-down direction) that corresponds to above and below the character when the first primary surface 7 is viewed from the front is defined as a Y direction, in order to facilitate understanding of the description. Further, a direction in which the first primary surface 7 and the second primary surface 8 face each other (a thickness direction) is defined as a Z direction.

The user 1 can perform a contactless communication by passing the first primary surface 7 or the second primary surface 8 over the reader/writer 5 without being careful about the left-and-right direction (X direction) and the up-and-down direction (Y direction) with respect to the IC key-chain item 10.

Figure 3:
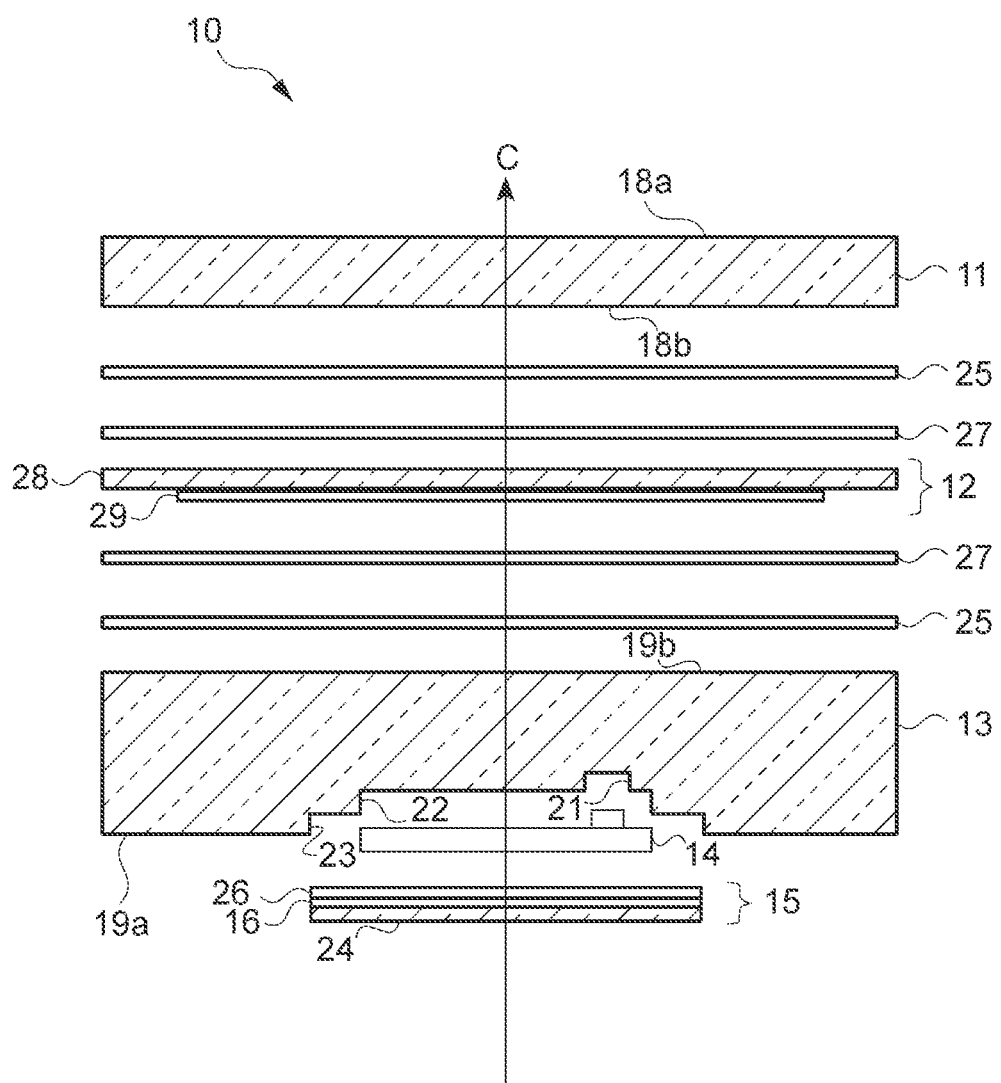
FIG. 3 is a cross-sectional view illustrating a cross section of each member included in the IC key-chain item.
Figure 3:
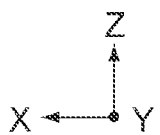

FIG. 2A is an exploded perspective view illustrating an example of a configuration of the IC key-chain item 10. Further, FIG. 2B schematically illustrates a shape of a lid portion 15, as viewed from a Z-axis direction. FIG. 3 is a cross-sectional view illustrating a cross section of each member included in the IC key-chain item 10. The cross-sectional view illustrated in FIG. 3 is a cross-sectional view of the IC key-chain item 10 in an exploded state.

A reference axis C illustrated in FIGS. 2A, 2B, and 3 is an axis that is parallel to the Z direction (the thickness direction) and passes through a communication reference position 17 that is defined with respect to the IC key-chain item 10. The communication reference position 17 will be described later.

The cross-sectional view illustrated in FIG. 3 corresponds to a cross-sectional view obtained by cutting the exploded perspective view illustrated in FIGS. 2A and 2B along a plane that is parallel to an XZ plane and includes the reference axis C.

As illustrated in FIGS. 2A, 2B, and 3, the IC key-chain item 10 includes a top layer portion 11, a print portion 12, a concave layer portion 13, an IC module 14, the lid portion 15, a print layer 16, an adhesive layer 25, and a primer 27. Note that the illustrations of the print layer 16, the adhesive layer 25, and the primer 27 are omitted in FIGS. 2A and 2B. In the present embodiment, a transparent resin material such as a polymethyl methacrylate (PMMA) resin is adopted so that the IC key-chain item 10 has an appearance of an acrylic key-chain item. The material of the IC key-chain item 10 is not limited thereto, and may be adopted discretionarily.

In the present embodiment, the IC key-chain item 10 has a uniform thickness from the first primary surface 7 to the second primary surface 8. In other words, the top layer portion 11 and the concave layer portion 13 are connected to each other in the thickness direction. Further, the first primary surface 7 and the second primary surface 8 are flat without, for example, unevenness. Consequently, a communication distance between the IC key-chain item 10 and the reader/writer 5 in a Z' direction becomes constant when the IC key-chain item 10 is passed over the reader/writer 5, and this results in being able to maintain a high communication performance.

The top layer portion 11 is a member made of a transparent resin material. The transparent resin material is a transparent resin material such as an acrylic resin, polycarbonate, or PMMA. Note that "being transparent" includes "being semi-transparent" in concept. In the present embodiment, the top layer portion 11 is a member made of PMMA.

Further, the top layer portion 11 includes a first top-layer surface 18a that corresponds to the first primary surface 7, and a second top-layer surface 18b. The second top-layer surface 18b is a surface that is situated opposite to the first top-layer surface 18a (the first primary surface 7), and is connected to the print portion 12. In the present embodiment, the first top-layer surface 18a and the second top-layer surface 18b are flat without unevenness in an X-axis direction and a Y-axis direction. Furthermore, in the present embodiment, an outer shape of the top layer portion 11 is a shape along a contour of a character that is printed in the print portion 12.

The adhesive layer 25 is a member used to connect the components of the IC key-chain item 10. A UV adhesive that is hardened by being irradiated with ultraviolet light, or an acrylic pressure-sensitive adhesive is used as a material of the adhesive layer 25. In the present embodiment, the adhesive layer 25 has a thickness of 0.03 mm.

Further, in the present embodiment, a UV adhesive is used for the adhesive layer 25 being arranged between the top layer portion 11 and the print portion 12 and between the print portion 12 and the concave layer portion 13, as illustrated in FIG. 3.

The primer 27 is a member that improves adhesion of the adhesive layer 25. In the present embodiment, the primer 27 has a thickness of 0.03 mm. Further, the primer 27 is arranged between the top layer portion 11 and the adhesive layer 25 and between the print portion 12 and the adhesive layer 25.

The print portion 12 is a member in which printing is performed, and includes a transparent film 28 and a print layer 29. In the present embodiment, the print portion 12 is formed by digital printing being performed in the transparent film 28. At least one of a character, a word, a picture, a photo, or a figure is printed in the print portion 12.

The transparent film 28 is made of a transparent material. In the present embodiment, polyethylene terephthalate (PET) is used as a material of the transparent film 28. Further, in the present embodiment, the transparent film 28 has a thickness of 0.075 mm.

The print layer 29 is a member in which printing is performed. In the present embodiment, the print layer 29 printed in the transparent film 28 has a thickness of 0.005 mm. Further, a liquid toner is used for the print layer 29. Note that, in the present embodiment, the print layer 29 corresponds to a print layer that is arranged between a first member and a second member.

The concave layer portion 13 includes a concave portion 20, and is a member made of PMMA. In the present embodiment, the concave layer portion 13 includes a first concave-layer surface 19a that corresponds to the second primary surface 8, and a second concave-layer surface 19b that is connected to the print portion 12.

The concave portion 20 is formed in the first concave-layer surface 19a (the second primary surface 8) to be capable of accommodating therein the IC module 14. In the present embodiment, the concave portion 20 is formed such that a direction of a depth of the concave portion 20 is the Z-axis direction, and such that the concave portion 20 is circular, as viewed from the Z-axis direction. As viewed from the Z-axis direction, the concave portion 20 has a shape conforming to a circular shape of the IC module 14.

A region of the first concave-layer surface 19a that is other than the concave portion 20 is flat without unevenness in the X-axis direction and the Y-axis direction (an XY-plane direction). Further, the second concave-layer surface 19b is also flat without unevenness in the X-axis direction and the Y-axis direction. Further, an outer shape of the concave layer portion 13 is a shape along a contour of the character printed in the print portion 12. In the present embodiment, the top layer portion 11 and the concave layer portion 13 have the same outer shape, as viewed from the Z-axis direction, as illustrated in FIGS. 2A and 2B. The top layer portion 11 and the concave layer portion 13 are connected to each other without respective edges of the top layer portion 11 and the concave layer portion 13 being misaligned, as viewed from the Z-axis direction.

Further, in the present embodiment, the concave layer portion 13 has a thickness of 2 mm. The IC module 14 and the lid portion 15 are accommodated in the concave portion 20 formed in the concave layer portion 13. Furthermore, a first accommodation portion 21, a second accommodation portion 22, and a third accommodation portion 23 are formed in the concave portion 20, the first accommodation portion being used to accommodate an antenna, a processor, and a capacitor of the IC module 14, the second accommodation portion 22 being used to accommodate a substrate of the IC module 14, the third accommodation portion 23 being used to accommodate the lid portion 15, as illustrated in FIG. 3.

The IC module 14 includes an antenna, a processor, a tuned circuit, and a capacitor. The respective components included in the IC module 14 enable the IC key-chain item 10 to perform a contactless communication with the reader/writer 5. Note that, in the present embodiment, a transparent resin material such as an acrylic resin, polycarbonate, or PMMA is used. This results in being able to reduce an impact on the IC module 14 with respect to a communication performance, and thus in there being no need to adjust the tuned circuit. Of course, the antenna and the tuned circuit may be adjusted to be suitable for a shape and a material of the IC key-chain item 10, in order to achieve a specified communication performance. For example, the antenna and the tuned circuit are adjusted on the basis of, for example, a length (a thickness) of the IC key-chain item 10 (thickness) in the Z-axis direction, or a dielectric constant of a member that is included in the IC key-chain item 10.

Examples of the IC module 14 include a contactless IC token in the form of a coin, such as RC-S109. Without being limited thereto, the present technology can of course also be applied to other IC modules.

In the present embodiment, the substrate of the IC module 14 has a thickness of 0.45 mm.

The lid portion 15 includes an adhesive layer 26, a lid layer 24 made of PMMA, and the print layer 16 being arranged between the adhesive layer 26 and the lid layer 24. Further, the lid portion 15 is arranged to entirely cover the concave portion 20, as viewed from the thickness direction. In the present embodiment, the lid portion 15 is formed such that the lid portion 15 can be accommodated in the concave portion 20. In other words, the lid portion 15 is arranged such that the IC module 14 is situated between the lid portion 15 and the concave layer portion 13.

Further, in the present embodiment, the lid portion 15 is arranged such that a surface of the lid portion 15 (the surface of the lid layer 24) that is situated opposite to the IC module 14 is situated in plane with a surface (the first concave-layer surface 19a), of the concave layer portion 13, in which the concave portion 20 is formed. In other words, the surface, of the concave layer portion 13, to which the lid portion 15 has been connected is flat in the X-axis direction and the Y-axis direction.

In the present embodiment, the lid portion 15 has a thickness of 0.65 mm.

A mark used to indicate the communication reference position 17 being used as a reference when a contactless communication is performed by the IC module 14, is printed in the print layer 16. For example, a pattern or a word is printed that enables the communication reference position 17 to be visually recognized. Further, a UV ink or the like may be used for the print layer 16.

The communication reference position 17 is a reference position with which a wireless contactless communication can be performed between the IC key-chain item 10 and the reader/writer 5. A wireless communication is properly performed by a portion that corresponds to the communication reference position 17 being passed over the reader/writer 5. For example, when the IC key-chain item 10 is passed over the reader/writer 5 situated away from the communication reference position 17, that is, when a portion different from the portion corresponding to the communication reference position 17 is passed over, this may result in being unable to perform communication.

This enables the user 1 to properly pass the IC key-chain item 10 over the reader/writer 5, and thus to perform a contactless communication with certainty. In other words, a higher operation performance for the user 1 is provided.

Note that the shape and the size of a mark that is printed in the print layer 16 are not limited. For example, any other shape or size that prevents the IC module 14 from being viewed from the Z-axis direction may be adopted. Since the IC module 14 is situated between the print layer 16 (the lid portion 15) and the print portion 12, it is possible to sufficiently prevent the IC module 14 from being seen through.

Further, the lid portion 15 includes a recess 15*a* and a recess 15*b* that have different shapes, as illustrated in FIG. 2B. In the present embodiment, the recesses 15*a* and 15*b* are asymmetrically formed. In other words, the lid portion 15 is formed such that the lid portion 15 is not in the same state even when, for example, the lid portion 15 is rotated or turned over. This makes it possible to prevent the lid portion 15 in a wrong position from being inserted into the concave portion 20.

In the present embodiment, the concave portion 20 is formed to have a length of at least 1.13 mm in the Z-axis direction, in consideration of the thicknesses of a substrate of the IC module 14, the lid portion 15, and the adhesive layer 26. Without being limited thereto, the concave portion 20 may be formed discretionarily depending on, for example, the thickness of the IC module 14, or play may be provided. Further, the shape of the concave portion 20 is not limited. For example, the shapes of the first accommodation portion 21, the second accommodation portion 22, and the like may be appropriately designed in conformity with the shape of the IC module 14.

Further, the method for connecting the IC module 14 and the lid portion 15 also is not limited. For example, an adhesive layer may be arranged between the IC module 14 and the lid portion 15, or the second accommodation portion 21 and the third accommodation portion 22 may be formed to have structures (shapes) that make it possible to connect the IC module 14 and the lid portion 15.

An acrylic pressure-sensitive adhesive is used for the adhesive layer 26. In the present embodiment, the adhesive layer 26 has a thickness of 0.03 mm.

Note that, in the present embodiment, the top layer portion 11 is connected to a first surface or a second surface, and corresponds to the second member made of a second transparent resin material.

Note that, in the present embodiment, an acrylic resin and polycarbonate correspond to a first transparent resin material and the second transparent resin material.

Note that, in the present embodiment, the concave layer portion 13 includes the first surface, the second surface situated opposite to the first surface, and a concave portion that is formed in the first surface and accommodates therein the IC module. The concave layer portion 13 corresponds to the first member made of the first transparent resin material. Further, the first concave-layer surface 19*a* (the second primary surface 8) of the concave layer portion 13 corresponds to the first surface in which the concave portion accommodating therein the IC module is formed. Further-more, the second concave-layer surface 19*b* of the concave layer portion 13 corresponds to the second surface situated opposite to the first surface.

Note that, in the present embodiment, the concave portion 20 corresponds to the concave portion accommodating therein the IC module.

Note that, in the present embodiment, the lid portion 15 corresponds to a lid member that is arranged to cover the concave portion accommodating therein the IC module. Further, in the present embodiment, the recesses 15*a* and 15*b* correspond to a plurality of recesses being included in the lid member and having different shapes.

Note that, in the present embodiment, the print layer 16 corresponds to a position display member that indicates a reference position. Further, the communication reference position 17 corresponds to a reference position.

FIGS. 4A, 4B, 4C, and 4D schematically illustrate examples of variations of an outer shape of the IC key-chain item 10. A dashed circle 35 schematically indicates a position of the IC module 14.

Figure 4A:
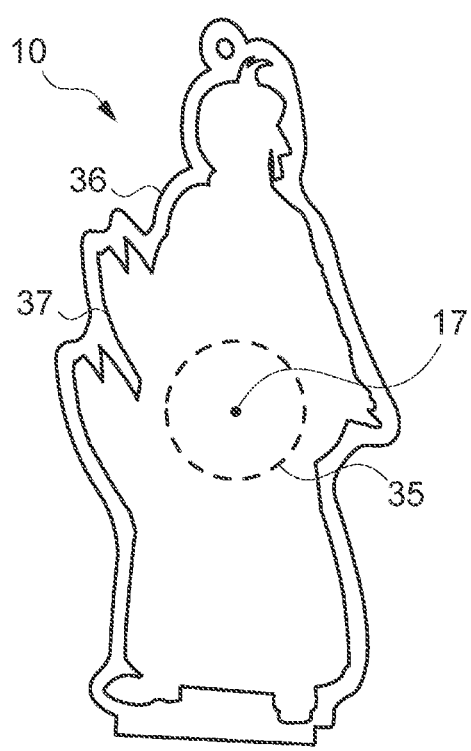
FIGS. 4A, 4B, 4C, and 4D schematically illustrate an outer shape of the IC key-chain item.

In the present embodiment, the IC key-chain item 10 is formed to have an outer shape 36 depending on a character 37 printed in the print section 12, as illustrated in FIG. 4A.

The outer shape of the character 37 corresponds to an outer shape of the print layer 29, as viewed from the thickness direction (the Z direction). In other words, the print layer 29 has a specified outer shape, as viewed from the thickness direction.

The surface portion 11 and the concave layer portion 13 have outer shapes based on the outer shape of the character 37 (the outer shape of the print layer 29), as viewed from the thickness direction.

Figure 4B:
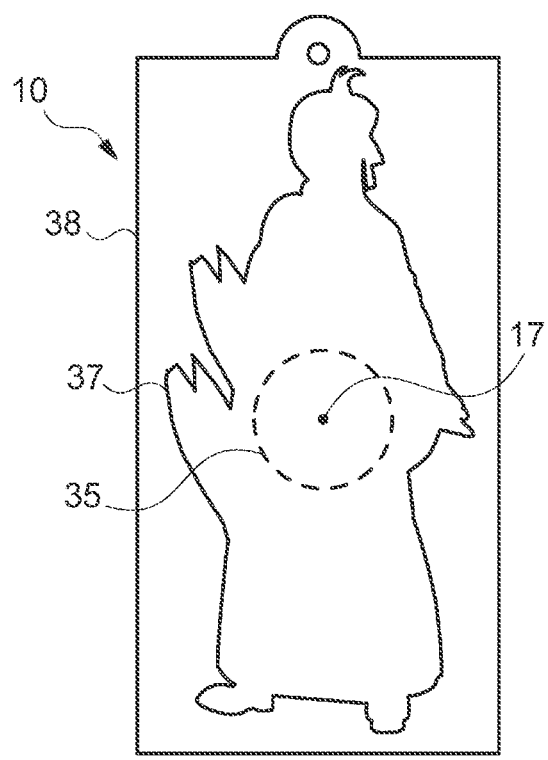
Figure 4C:
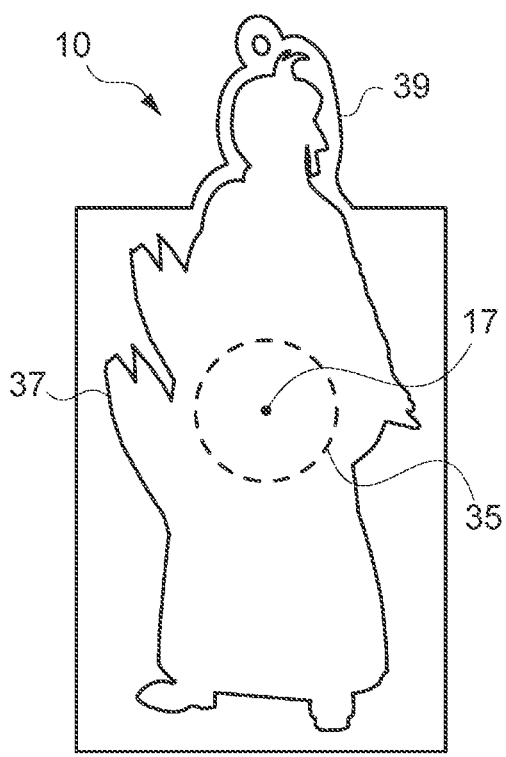

Without being limited thereto, the IC key-chain item 10 may be formed to have any outer shape. For example, the IC key-chain item 10 may have an outer shape 38 of, for example, a rectangle that includes the character 37 printed in the print section 12, as illustrated in FIG. 4B. Further, for example, the IC key-chain item 10 may have an outer shape 39 obtained by combining a shape along the character 37 and a rectangle, as illustrated in FIG. 4C. Furthermore, the IC key-chain item 10 may have an outer shape 40 depending on an outer shape in the case in which two characters 37 are arranged side by side in the print portion 12.

Figure 4D:
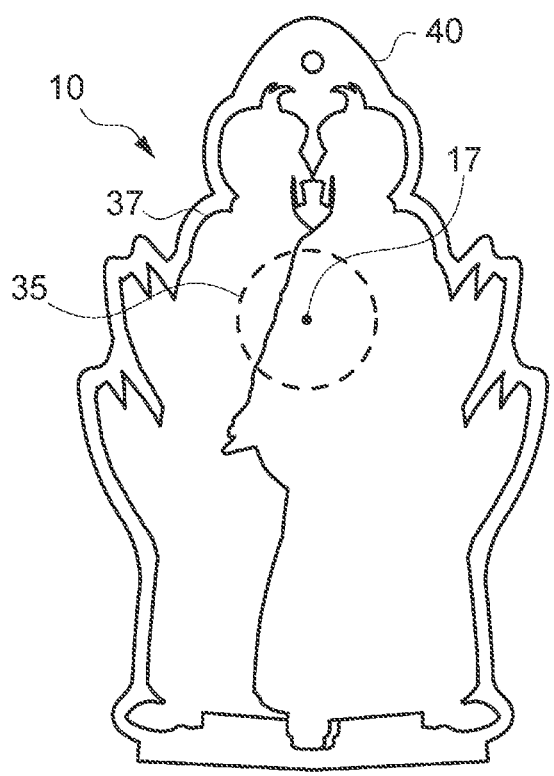

The configurations illustrated in FIGS. 4B, 4C, and 4D are also included in the example in which the surface portion 11 and the concave layer portion 13 have outer shapes based on the outer shape of the character 37 (the outer shape of the print layer 29), as viewed from the thickness direction.

Accordingly, the outer shape of the IC key-chain item 10, as viewed from the thickness direction, can be designed discretionarily in the XY-plane direction illustrated in FIGS. 2A, 2B, and 3.

As described above, a region situated around a place (the dashed circle 35) at which the IC module 14 is arranged has a fixed layer configuration (a fixed thickness) in the XY-plane direction, and is flat without unevenness. Thus, the IC key-chain item 10 having any outer shape achieves an equal communication performance in a communication distance direction represented by the Z' direction illustrated in FIG. 1. Further, an equal communication performance is also achieved in an offset direction (an X'-axis direction and a Y'-axis direction) regardless of, for example, a change in outer shape.

In other words, the communication performance in contactless communication can be maintained in each of the examples of the variations illustrated in FIGS. 4A, 4B, 4C, and 4D.

Further, the configurations of the respective layers of the IC key-chain item 10 are defined, as illustrated in FIG. 3. This makes it possible to discretionarily set a position, of the IC key-chain item 10, at which the IC key-chain item 10 is passed over the reader/writer 5 in order to perform a contactless communication. In other words, where the communication reference position 17 is to be set can be determined discretionarily.

On the basis of the set communication reference position 17, the concave portion 20 is formed, and the IC module 14 is accommodated in the concave portion 20. This results in a proper wireless communication based on the communication reference position 17. It can also be said that the position of the IC module 14 (the circle 35) can be set discretionarily.

[Method for Producing IC Key-Chain Item]

In general, an acrylic key-chain item is formed by backprinting a single transparent acrylic plate. Further, an acrylic key-chain item includes a transparent surface and a transparent edge. This makes it possible to provide an appearance of depth or a three-dimensional appearance.

In the present embodiment, the IC key-chain item 10 internally including the IC module 14 and being capable of performing a contactless communication is formed by bonding a plurality of plate members (such as the top layer portion 11 and the concave layer portion 13), as illustrated in, for example, FIGS. 2A and 2B.

For example, UV bonding; a welding technique using, for example, an ultrasonic wave, a laser, or heat; or a double-sided tape such as an optical clear adhesive (OCA) is used when plate members each having a smooth surface are bonded to each other.

If air bubbles are generated when plate members of a plurality of plate members are bonded to each other, as described above, and if the generated air bubbles exist in a portion that is to be transparent, this may result in a significant reduction in merchantability. The sufficient reduction in the generation of air bubbles makes it possible to provide transparency and a three-dimensional appearance that are equivalent to those of an acrylic key-chain item of a single transparent acrylic plate. This results in being able to provide the IC key-chain item 10 being capable of performing a contactless communication and having a high degree of merchantability.

Further, there are advantages indicated below when UV bonding is used to bond plate members.

Since a material used for UV bonding is liquid, a difference in level that is caused due to the thicknesses of the transparent film 28 and the print layer 29 (refer to FIG. 3) is easily eliminated, and air bubbles are unlikely to be generated. Further, the material used for UV bonding is highly transparent.

Further, in the case of UV bonding, there is no need for a member that is used when laser welding or heat (ultrasonic) welding is performed, and holds a plate member upon bonding. There is also no need for a mold such as a metal mold that is used to transfer heat to a bonding surface.

Furthermore, in the case of UV bonding, air bubbles are unlikely to be generated when plate members are bonded to each other.

Moreover, in the case of UV bonding, it is possible to handle a large work size. In other words, in the case of UV bonding, it is also possible to handle a large plate member.

For example, UV bonding provides an advantage in, for example, connecting a first transparent member 60 and a second transparent member 61 using, for example, a method for producing a plurality of IC key-chain items 10 that will be described later with reference to FIGS. 6A, 6B, 6C, 6D, and 7.

Figure 5:
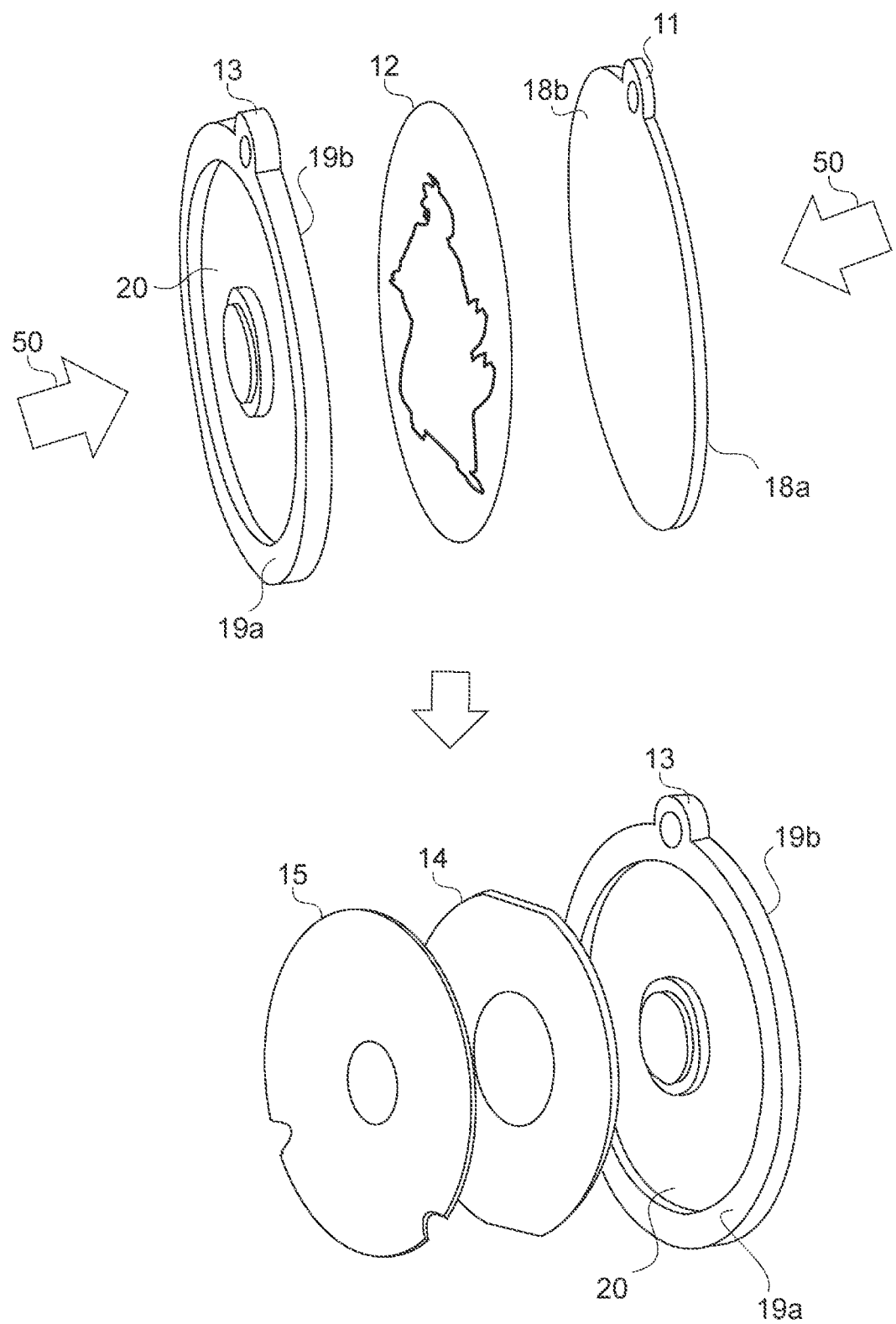
FIG. 5 is a schematic diagram used to describe an example of a method for producing the IC key-chain item.
Figure 6A:
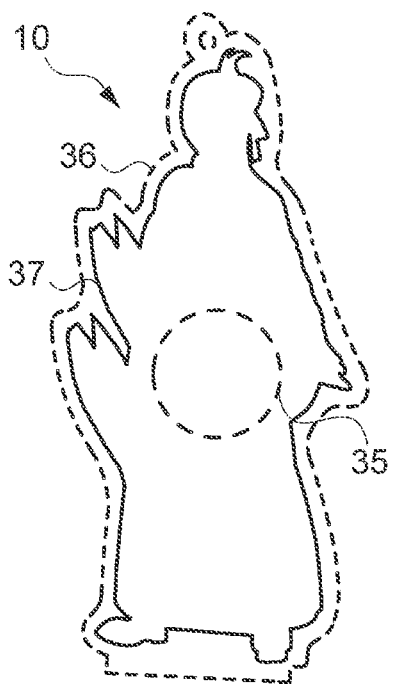
FIGS. 6A, 6B, 6C, and 6D are schematic diagrams used to describe another example of the method for producing the IC key-chain item.
Figure 6B:
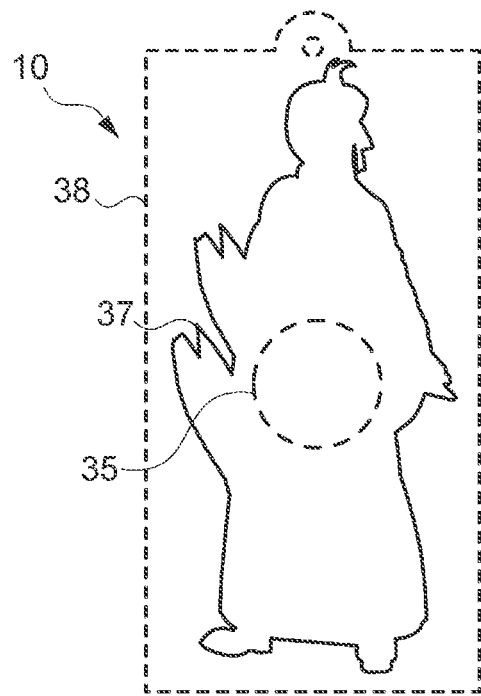
Figure 6C:
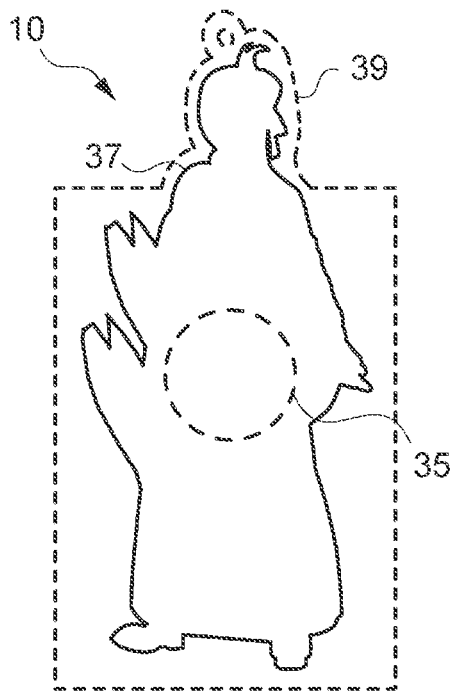
Figure 6D:
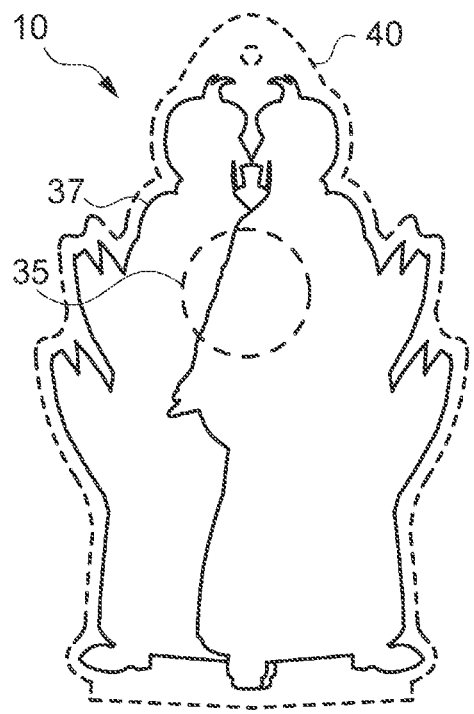
Figure 7:
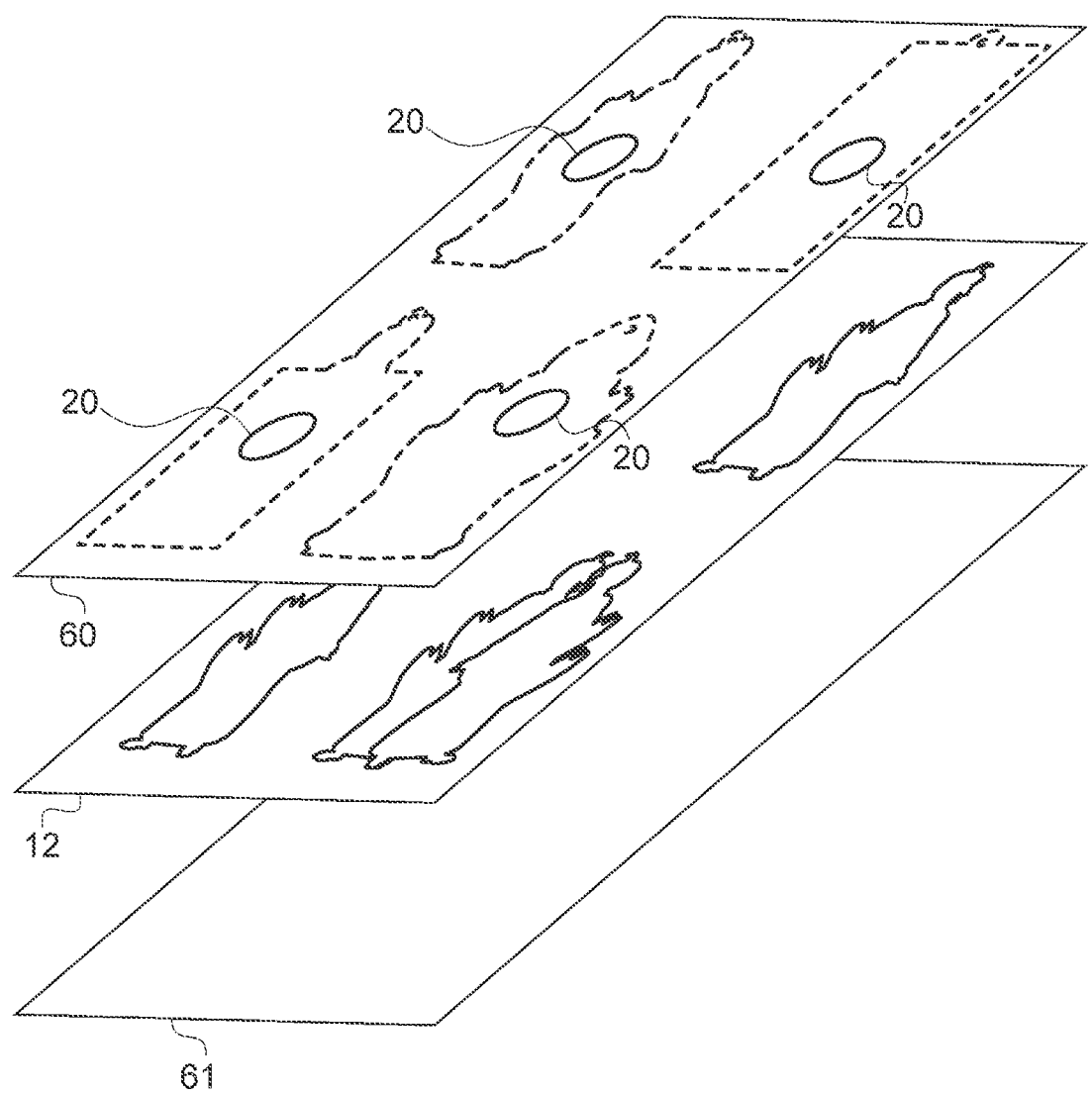
FIG. 7 is an exploded perspective view illustrating an example of a configuration of a processed plate.

FIG. 5 is a schematic diagram used to describe an example of the method for producing the IC key-chain item 10. FIG. 5 illustrates an example of a configuration of the IC key-chain item 10 having a circular outer shape, as viewed from the thickness direction.

The concave layer portion 13 including the first concave-layer surface 19a (the second primary surface 8) including the concave portion 20, and the second concave-layer surface 19b situated opposite to the second primary surface 8 is formed using a transparent resin material.

The top layer portion 11 is formed using a transparent resin material.

As illustrated in FIG. 5, the adhesive layer 25 (a UV adhesive) and the primer 27 are applied between the top layer portion 11 and the print portion 12.

The adhesive layer 25 and the primer 27 are applied between the print portion 12 and the concave layer portion 13.

The top layer portion 11, the print portion 12, and the concave layer portion 13 are connected to each other, and ultraviolet light 50 is irradiated onto the first primary surface 18a (the first primary surface 7) of the top layer portion 11, and onto the second primary surface 8 of the concave layer portion 13. In other words, the top layer portion 11 is connected to the first concave-layer surface 19a of the concave layer portion 13 such that the print portion 12 is arranged between the top layer portion 11 and the concave layer portion 13.

The IC module 14 used to perform a contactless communication is accommodated in the concave portion 20.

The IC module 14 and the lid portion 15 in which the print layer 16 is printed are connected to each other using the adhesive layer 26 (an acrylic pressure-sensitive adhesive).

Accordingly, the IC key-chain item 10 is formed.

FIGS. 6A, 6B, 6C, 6D, and 7 are schematic diagrams used to describe another example of the method for producing the IC key-chain item 10. In this method, a plurality of IC key-chain items 10 is cut out to be produced.

The first transparent member 60 including a plurality of concave portions 20 is formed using a transparent resin material. In the example illustrated in FIG. 7, each portion in the first transparent member 60 is indicated by a dashed line along an outer shape of a corresponding one of the IC key-chain items 10. However, such a line or the like that defines the outer shape does not necessarily have to be formed.

The second transparent member 61 is formed using a transparent resin material.

A UV adhesive and the primer 27 are applied between the first transparent member 60 and the print portion 12 in which characters of the respective IC key-chain items 10 are printed.

A UV adhesive and the primer 27 are applied between the second transparent member 61 and the print portion 12.

The first transparent member 60, the print portion 12, and the second transparent member 61 are connected to each other, and the ultraviolet light 50 is irradiated from both sides.

The IC module 14 used to perform a contactless communication is accommodated in each of the plurality of concave portions 20.

The lid portion 15 in which the print layer 16 is printed is arranged to cover each of the plurality of concave portions 20 each accommodating therein the IC module 14. The IC module 14 and the lid portion 15 are connected to each other using the adhesive layer 26 (an acrylic pressure-sensitive adhesive).

A portion that includes each of the plurality of concave portions 20 each accommodating therein the IC module 14 is cut out to have a specified shape. Accordingly, a plurality of IC key-chain items 10 is formed.

Note that, in the present embodiment, the method for producing an IC key-chain item corresponds to a method for producing a contactless communication medium. Further, the method for producing the IC key-chain item 10 described above is merely an example, and the method for producing an IC key-chain item is not limited to the method described above.

Note that, in the present embodiment, the outer shapes 36, 38, 39, and 40 each correspond to a specified shape of a cut-out portion that includes a corresponding one of the plurality of concave portions 20 each accommodating therein an IC module.

As described above, in the IC key-chain item 10 according to the present embodiment, the IC module 14 used to perform a contactless communication is accommodated in the concave portion 20 formed in the concave layer portion 13, and the concave portion 20 is covered by the lid portion 15. Further, the top layer portion 11 is connected to the first concave-layer surface 19a (the second primary surface 8) in which the concave portion 20 of the concave layer portion 13 is formed, or to the second concave-layer surface 19b situated opposite to the first concave-layer surface 19a in which the concave portion 20 is formed, and the print portion 12 is arranged between the concave layer portion 13 and the top layer portion 11. This makes it possible to easily provide a contactless communication medium produced with a high design quality.

There are two conceivable issues with respect to the development of a differently shaped product that has a shape other than a card and a token and internally includes a contactless IC tag. The first issue is a high initial cost for, for example, a metal mold or a plate used to form various different shapes, and a long production lead time.

For example, with respect to a metal mold, there is a method for performing punching to obtain a unified prescribed card size using a trim die.

Further, with respect to a plate, there is a method including preparing a sheeted print plate on which a plurality of unified shapes and a plurality of unified faces for, for example, a card are imposed; bonding, to a front face, an exterior material obtained by printing performed using the printing plate; and performing punching.

The present embodiment makes it possible to cut out any shape of a large plate obtained by arranging a printed sheet and a plate in a layered formation and bonding the sheet and plate, the printed sheet on which a plurality of shapes is imposed, as illustrated in, for example, FIGS. 6A, 6B, 6C, 6D, and 7. Further, it is also possible to bond a back-printed acrylic plate or a printed transparent sheet, where the printing is performed using a digital printing machine without a printing plate.

This results in being able to perform production with no initial cost, that is, without a metal mold or a printing plate.

The second issue is that there is a need to adjust an antenna and a tuned circuit of a contactless IC tag for each shape since the dielectric constant, the thickness, the quality, and the like differ depending on the material covering the tag. This results in there being a need to take a test related to a communication performance (a communication test) again for each shape.

With respect to a differently shaped product that has any shape and internally includes a contactless IC tag, the outer shape and the material differ depending on the product, which is different from a card and a token. Thus, an antenna and a tuned circuit are adjusted for each product as necessary. Further, for each adjustment, there is a need to measure a communication distance and an offset communication distance from a communication position, and to check whether a prescribed communication performance is achieved.

If a differently shaped product has a fixed thickness and the position at which the differently shaped product is passed over, for example, a reader/writer is defined, as in the case of a card, a communication test can be easily carried out. On the other hand, a key-chain item, such as an acrylic key-chain item, that is obtained by performing printing in a single transparent plate, is generally formed using a plate having the same thickness.

The present embodiment adopts a multilayer configuration that makes it possible to maintain a layer configuration fixed while maintaining the appearance of an acrylic key-chain item, and a layer configuration for embedding an IC module. Further, the present embodiment provides a plate IC key-chain item without unevenness also in an offset direction (a direction orthogonal to a direction of the communication distance), while maintaining a fixed layer configuration (a fixed thickness) with respect to the communication distance. This makes it possible to maintain a defined communication performance without changing the communication performance. Further, IC key-chain items that have the same layer configuration and the same thickness, and in which materials of the layer configurations are the same, are formed. This results in maintaining a constant communication performance even when there is a change in outer shape, and results in there being no need to adjust a tuned circuit and to carry out a test again for each shape.

As described above, the use of the present technology makes it possible to solve the two issues described above, and thus to easily provide a contactless communication medium produced with a high design quality.

Further, in the present embodiment, the lid portion 15 and the print layer 16 are integrated with each other, and the recesses 15a and 15b are formed in the lid portion 15 such that the orientation and the position of the lid portion 15 can be fixed. This results in there being no need for a method for, for example, fixing a transparent sheet to a base using a pin in order to not deviate the position and the orientation of the print layer 16, the transparent sheet being a sheet in which a mark used to indicate the communication reference position 17.

In other words, in the present embodiment, there is no need for an expensive base necessary for each type. Further, there is also no need for a trim die necessary for each type of a shape of an IC key-chain item. Furthermore, there is no need for a region for a hole of a pin used to fix the print layer 16, that is, a disposable region. This results in an increase in the efficiency in imposition upon production, and thus in being able to reduce costs.

This makes it possible to increase an operation efficiency, and to give a high-quality appearance to an IC key-chain item.

Second Embodiment

An IC key-chain item 70 according to a second embodiment of the present technology is described. In the following description, descriptions of a configuration and an operation similar to those of the IC key-chain item 10 described in the embodiment above are omitted or simplified.

In the first embodiment, the concave portion 20 is formed in the first concave-layer surface 19a of the concave portion 13. In the second embodiment, a through-hole portion that includes a through-hole, and a cover portion that is connected to the through-hole portion to cover one of openings of the through-hole are formed. In other words, the concave layer portion 13 being capable of accommodating therein the IC module 14 is provided by the through-hole portion and the cover portion being connected to each other.

Figure 8:
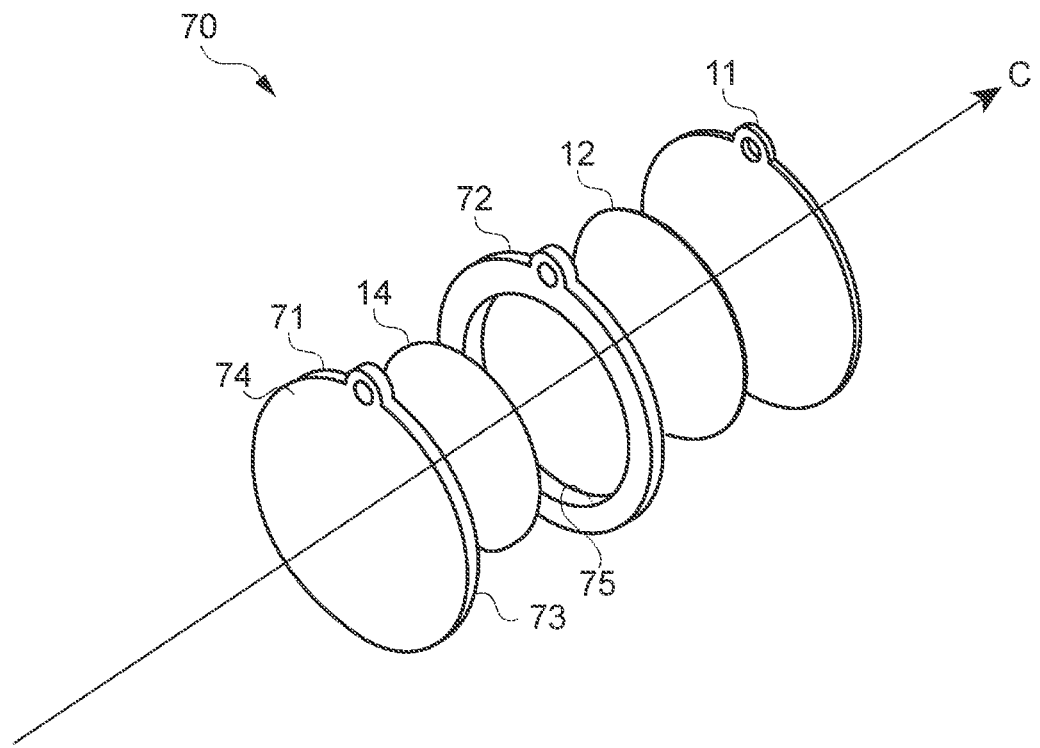
FIG. 8 is an exploded perspective view illustrating an example of a configuration of an IC key-chain item according to a second embodiment.
Figure 9:
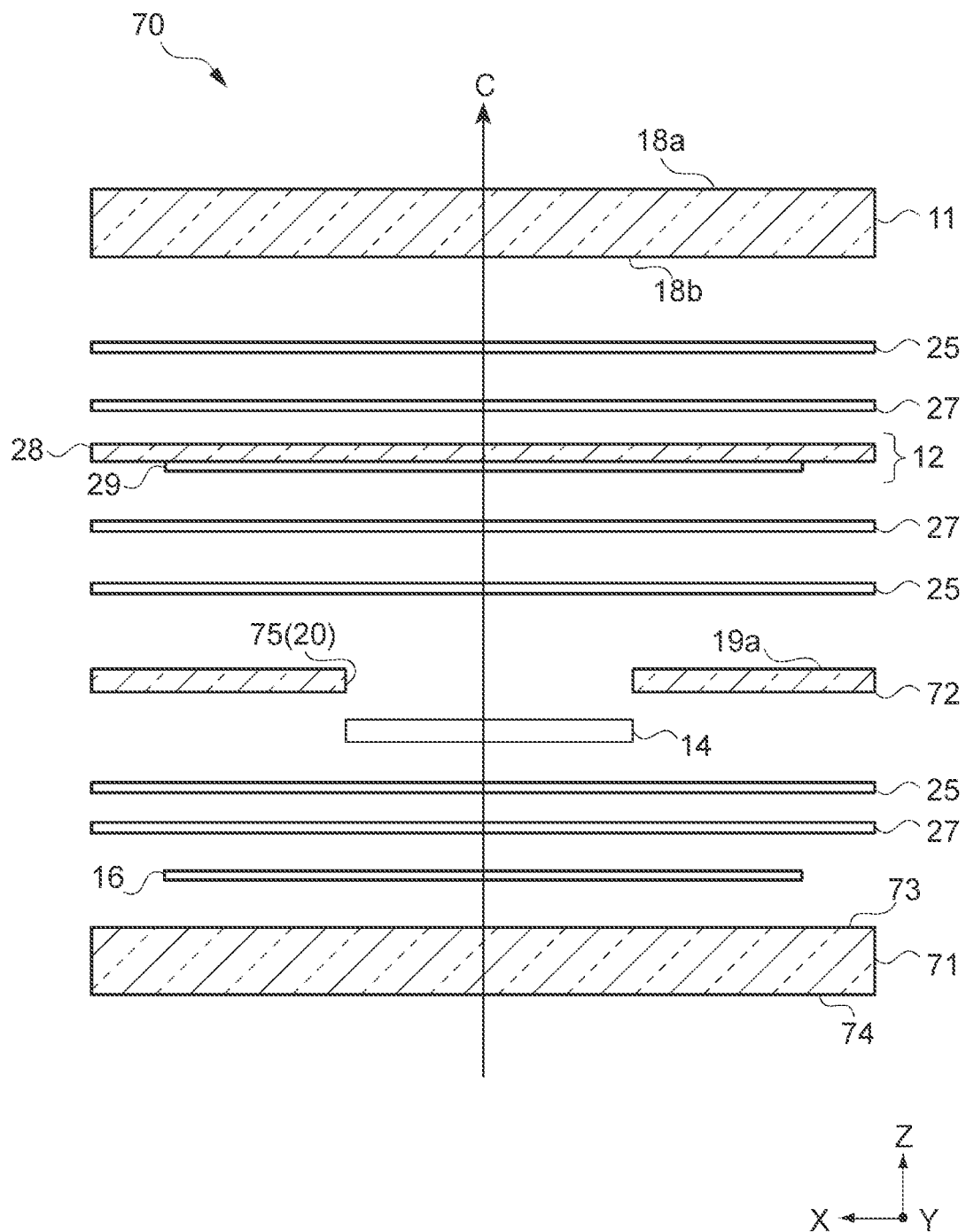
FIG. 9 is a sectional view illustrating a cross section of each member included in the IC key-chain item.

FIG. 8 is an exploded perspective view illustrating an example of a configuration of an IC key-chain item 70 according to the second embodiment of the present technology. FIG. 9 is a cross-sectional view illustrating a cross section of each member included in the IC key-chain item 70.

As illustrated in FIGS. 8 and 9, the IC key-chain item 70 includes the top layer portion 11, the print portion 12, a cover portion 71, a through-hole portion 72, the IC module 14, the print layer 16, the adhesive layer 25, and the primer 27. Note that the illustrations of the print layer 16, the adhesive layer 25, and the primer 27 are omitted in FIG. 8.

The cover portion 71 is a member made of a transparent resin material. For example, the cover portion 71 is made of PMMA. In the present embodiment, the cover portion 71 includes a first connection surface 73 that is connected to the through-hole portion 72, and a second connection surface 74 situated opposite to the first connection surface 73.

The through-hole portion 72 includes a through-hole 75, and is a member made of a transparent resin material. For example, the through-hole 75 is formed using PMMA, as in the case of the cover portion 71. The through-hole 75 is formed to be capable of accommodating therein the IC module 14. In the present embodiment, the top layer portion 11 is connected to cover one of openings of the through-hole 75. Accordingly, the same configuration as the concave portion 20 described in the first embodiment is provided by the through-hole 75 of which one of the openings is covered.

As illustrated in FIG. 9, the first connection surface 73 and the second connection surface 74 of the cover portion 71 are flat without unevenness in the X-axis direction and the Y-axis direction. Further, except for the through-hole 75, a surface of the through-hole portion 72 is flat without unevenness in the X-axis direction and the Y-axis direction.

In the present embodiment, the cover portion 71 is formed to have a circular outer shape, as viewed from the thickness direction (the Z-axis direction). Further, through-hole portion 72 is formed to have a circular outer shape, as viewed from the thickness direction. In other words, the cover portion 71 and the through-hole portion 72 have the same outer shape, as viewed from the thickness direction.

Note that the length of the through-hole 75 in the thickness direction is not limited. Further, the shape of the through-hole 75 is also not limited. For example, the through-hole 75 may be formed discretionarily to have a shape depending on the shape of the IC module 14.

A UV adhesive or an acrylic pressure-sensitive adhesive is used for the adhesive layer 25 used to connect the cover portion 71 and the through-hole portion 72.

Note that, in the present embodiment, the through-hole portion 72 corresponds to a first separate member that includes a through-hole. The cover portion 71 corresponds to a second separate member that is connected to the first separate member to cover one of openings of the through-hole.

Further, in the present embodiment, when the cover portion 71 and the through-hole portion 72 are connected to each other, the first connection surface 73 of the cover portion 71 and the through-hole 75 correspond to a concave portion that accommodates therein an IC module.

Laser processing is suitable to form the through-hole portion 72 including the through-hole 75. The laser processing makes it possible to form the through-hole 75 in a short time with a high degree of accuracy. On the other hand, cutting processing such as counterboring processing is suitable to form the concave portion 20 described in the first embodiment.

Note that the methods for forming the respective components such as the top layer portion 11, the concave layer portion 13, and the through-hole portion 72 are not limited. Any formation methods may be adopted as appropriate depending on various conditions such as production costs and a production time.

The through-hole portion 72 including the through-hole 75 is formed using a transparent resin material.

The cover portion 71 is formed using a transparent resin material.

The top layer portion 11 is formed using a transparent resin material.

The print layer 16 is printed in the cover portion 71.

A UV adhesive is applied between the cover portion 71 and the through-hole portion 72, and the cover portion 71 and the through-hole portion 72 are connected to each other to cover one of the openings of the through-hole 75. This results in providing a configuration similar to the configuration of the concave layer portion 13 described in the first embodiment.

As illustrated in FIG. 9, the through-hole 75 is configured as the concave portion 20, and a surface of the through-hole portion 72 on the side of the top layer portion 11 corresponds to the first concave-layer surface 19a. Further, the second connection surface 74 of the cover portion 71 corresponds to the second concave-layer surface 19b.

The IC module 14 used to perform a contactless communication is accommodated in the through-hole 75 (a concave portion).

The adhesive layer 25 (a UV adhesive) and the primer 27 are applied between the top layer portion 11 and the print portion 12.

The adhesive layer 25 and the primer 27 are applied between the print portion 12 and the through-hole portion 72.

The top layer portion 11, the print portion 12, and the through-hole portion 13 are connected to each other, and ultraviolet light 50 is irradiated. In other words, the top layer portion 11 is connected to the through-hole portion 72 such that the print portion 12 is arranged between the top layer portion 11 and the through-hole portion 72.

Accordingly, the IC key-chain item 10 is formed.

Note that the order of the steps in the method for producing an IC key-chain item is not limited.

Further, a plurality of IC key-chain items 70 may be cut out, as illustrated in FIGS. 6A, 6B, 6C, 6D, and 7. For example, the first transparent member 60 may be provided by the first separate member and the second separate member being connected to each other, the first separate member including the through-hole 75, the second separate member being connected to the first separate member to cover one of the openings of the through-hole 75.

The first separate member including a plurality of through-holes 75 is formed using a transparent resin material.

The second separate member is formed using a transparent resin material.

The first transparent member 60 including a plurality of concave portions 20 is formed by the first separate member and the second separate member being connected to each other to cover openings of the plurality of through-holes 75 that are situated on the same side.

The IC module 14 used to perform a contactless communication is accommodated in each of the plurality of concave portions 20.

The second transparent member 61 is connected to the first transparent member 60 such that the print portion 12 is arranged between the first transparent member 60 and the second transparent member 61.

A portion that includes each of the plurality of concave portions 20 each accommodating therein the IC module 14 is cut out to have a corresponding one of the outer shapes 36 to 40.

Further, the method for cutting out the IC key-chain item 70 is performed by laser processing or cutting processing, as in the case of the production method described above.

Figure 10:
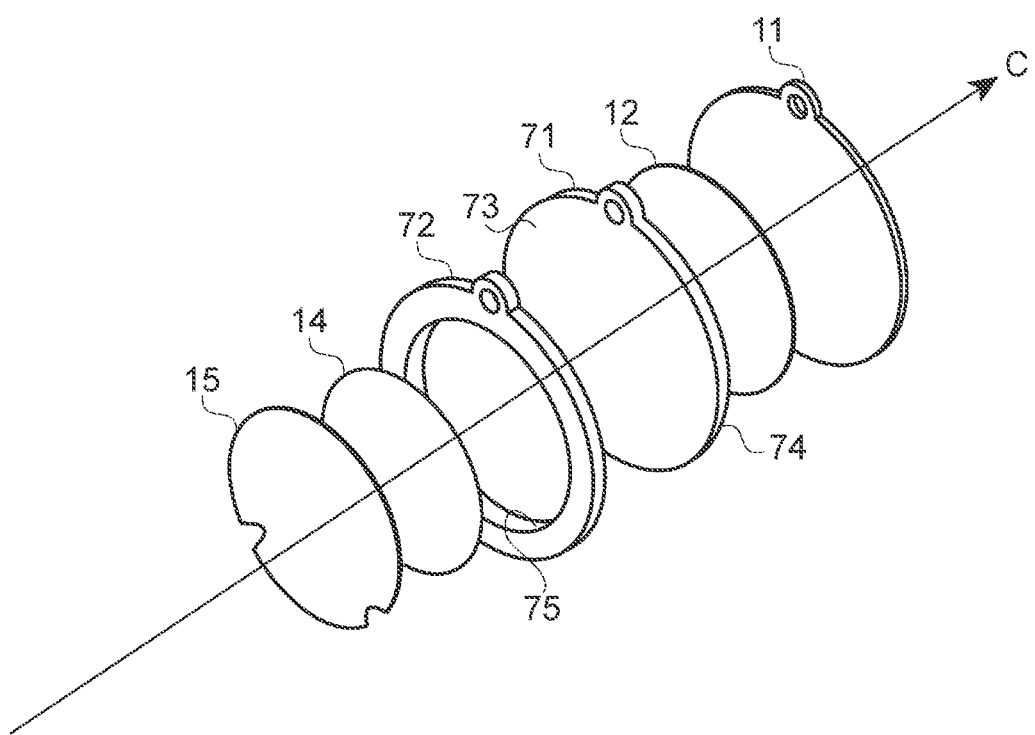
FIG. 10 is an exploded perspective view illustrating another example of the configuration of the IC key-chain item.
Figure 11:
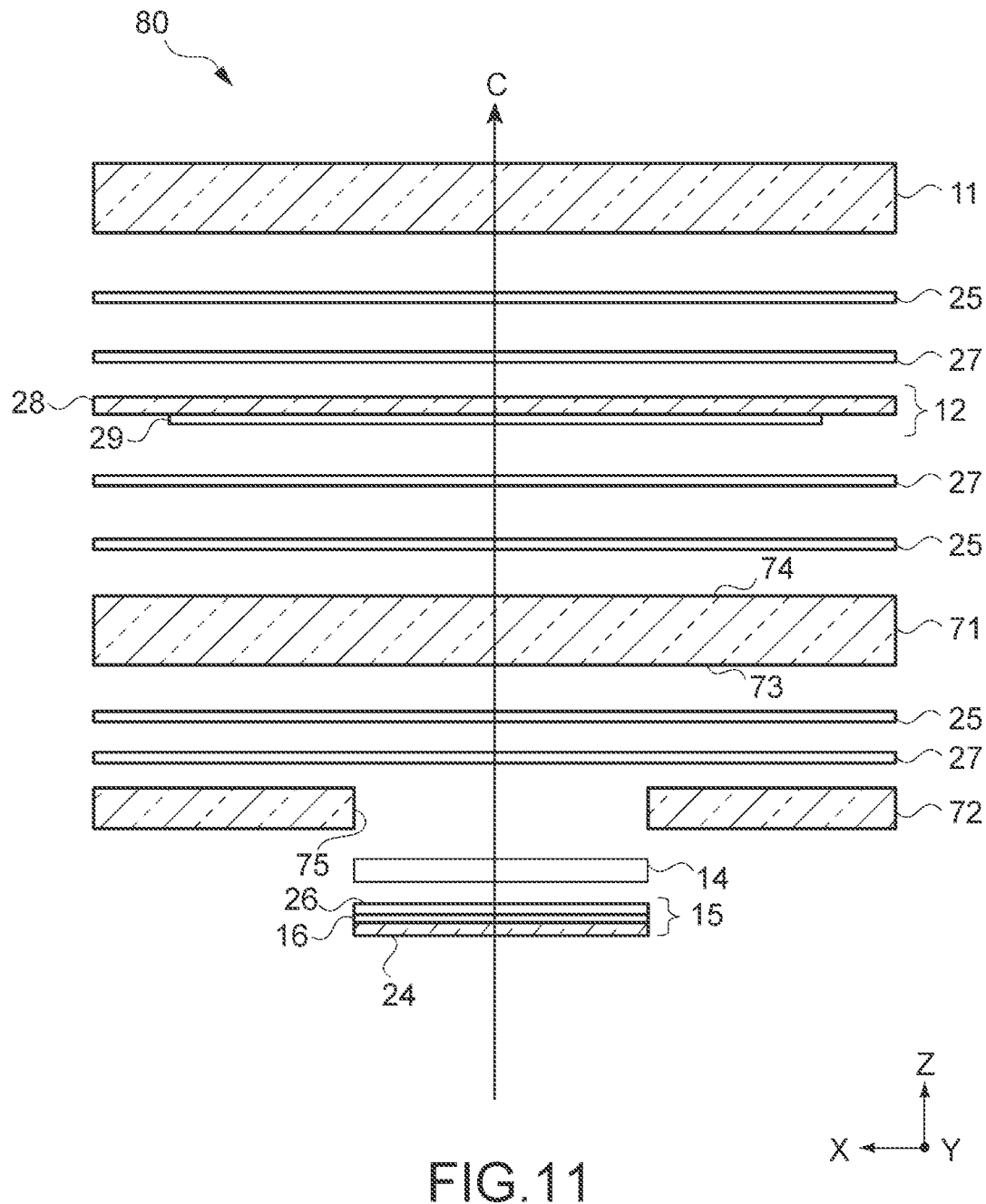
FIG. 11 is a cross-sectional view illustrating a cross section of each member included in the IC key-chain item.

FIG. 10 is an exploded perspective view illustrating another example of the configuration of the IC key-chain item 70 (referred to as an IC key-chain item 80). FIG. 11 is a cross-sectional view illustrating a cross section of each member included in the IC key-chain item 80. Note that descriptions of configurations and operations similar to those of, for example, the cover portion 71 and the through-hole portion 72 of the IC key-chain item 70 illustrated in, for example, FIG. 8 are omitted or simplified.

As illustrated in FIGS. 10 and 11, the IC key-chain item 80 includes the top layer portion 11, the print portion 12, the cover portion 71, the through-hole portion 72, the IC module 14, the lid portion 15, the print layer 16, the adhesive layer 25, and the primer 27. Note that the illustrations of the print layer 16, the adhesive layer 25, and the primer 27 are omitted in FIG. 10.

As illustrated in FIG. 11, the through-hole portion 72 is connected to the first connection surface 73 of the cover portion 71. In other words, the cover portion 71 is connected to cover one of the openings of the through-hole 75. Accordingly, the same configuration as the concave portion 20 described in the first embodiment is provided by the through-hole 75 of which one of the openings is covered.

Note that, in the present embodiment, the cover portion 71 corresponds to the second separate member being connected to the first separate member to cover one of the openings of the through-hole. Further, in the present embodiment, when the cover portion 71 and the through-hole portion 72 are connected to each other, the first connection surface 73 of the cover portion 71 and the through-hole 75 correspond to the concave portion accommodating therein the IC module.

Further, an example of a method for producing the IC key-chain item 80 is described.

The through-hole portion 72 including the through-hole 75 is formed using a transparent resin material.

The cover portion 71 is formed using a transparent resin material.

A UV adhesive is applied between the cover portion 71 and the through-hole portion 72, and the cover portion 71 and the through-hole portion 72 are connected to each other to cover one of the openings of the through-hole 75. This results in providing a configuration similar to the configuration of the concave layer portion 13 described in the first embodiment. In other words, the concave layer portion 13 including the first concave-layer surface 19a including the concave portion 20, and the second concave-layer surface 19b situated opposite to the first concave-layer surface 19a, is formed.

This makes it possible to form the IC key-chain item 80 as in the case of the method for producing the IC key-chain item 10 described above.

Note that the order of the steps in the method for producing an IC key-chain item is not limited. For example, the through-hole portion 72 may be connected to the cover portion 71 after the top layer portion 11, the print portion 12, and the cover portion 71 are connected to each other.

Further, a plurality of IC key-chain items 80 may be cut out, as illustrated in FIGS. 6A, 6B, 6C, 6D, and 7. For example, the first transparent member 60 may be provided by the first separate member and the second separate member being connected to each other, the first separate member including the through-hole 75, the second separate member being connected to the first separate member to cover one of the openings of the through-hole 75.

The first separate member including a plurality of through-holes 75 is formed using a transparent resin material.

The second separate member is formed using a transparent resin material.

The first transparent member 60 including a plurality of concave portions 20 is formed by the first separate member and the second separate member being connected to each other to cover the respective openings of the plurality of through-holes 75 that are situated on the same side.

The IC module 14 used to perform a contactless communication is accommodated in each of the plurality of concave portions 20.

The lid portion 15 in which the print layer 16 is printed is arranged to cover each of the plurality of concave portions 20 each accommodating therein the IC module 14.

The second transparent member 61 is connected to the first transparent member 60 such that the print portion 12 is arranged between the first transparent member 60 and the second transparent member 61.

A portion that includes each of the plurality of concave portions 20 each accommodating therein the IC module 14 is cut out to have a corresponding one of the outer shapes 36 to 40.

Further, the method for cutting out the IC key-chain item 80 is performed by laser processing or cutting processing, as in the case of the production method described above.

Other Embodiments

The present technology is not limited to the embodiments described above, and can achieve various other embodiments.

In the first embodiment described above, the top layer portion 11 is arranged such that the print layer 29 is situated between the top layer portion 11 and the second concave-layer surface 19b being included in the concave layer portion 13 and being situated opposite to the first concave-layer surface 19a. Without being limited thereto, the layer configuration of the IC key-chain item 10 may be arranged discretionarily.

Further, in the embodiments described above, the print layer 16 is printed in the lid portion 15. Without being limited thereto, the print layer 16 may be arranged on a side opposite to the print layer 12 such that the IC module 14 is situated between the print layer 16 and the lid portion 15.

Figure 12:
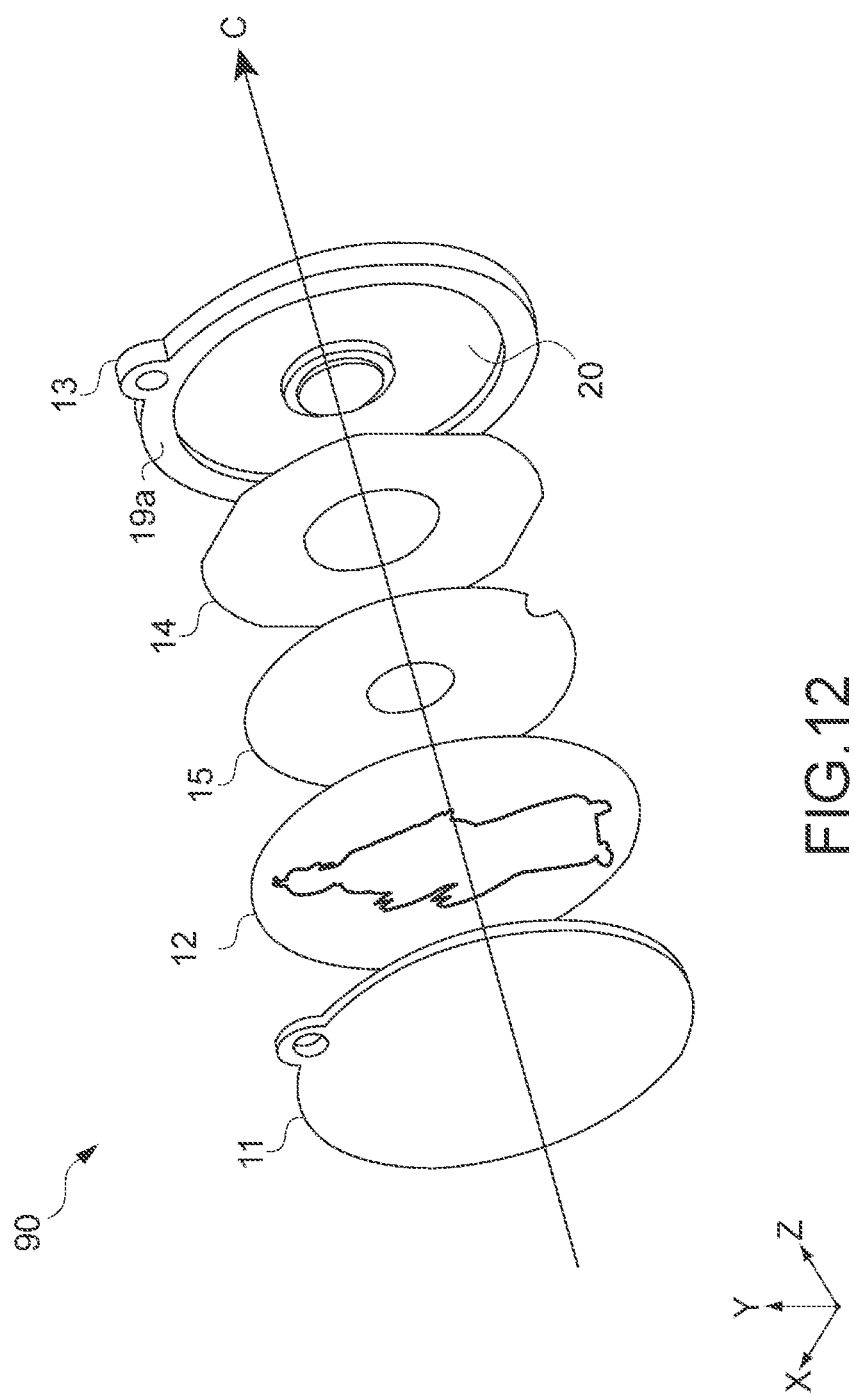
FIG. 12 is an exploded perspective view illustrating an example of a configuration of an IC key-chain item.

FIG. 12 is an exploded perspective view illustrating an example of a configuration of an IC key-chain item 90. FIG.

13 is a cross-sectional view illustrating a cross section of each member included in the IC key-chain item 90. The cross-sectional view illustrated in FIG. 13 is a cross-sectional view of the IC key-chain item 90 in an exploded state.

Figure 13:
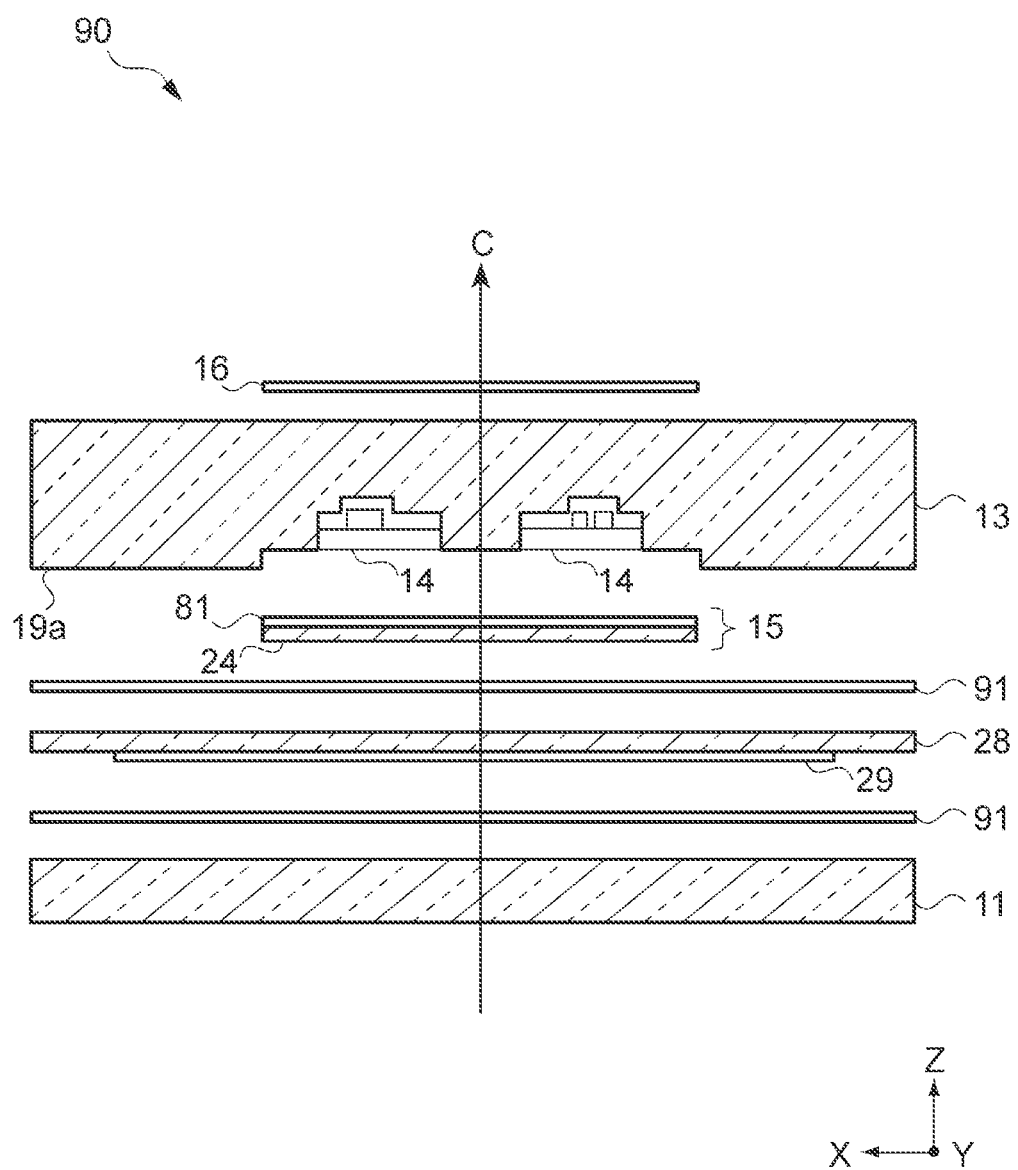
FIG. 13 is a cross-sectional view illustrating a cross section of each member included in the IC key-chain item.

As illustrated in FIGS. 12 and 13, the IC key-chain item 90 includes the top layer portion 11, the print portion 12, the lid portion 15, the IC module 14, the concave layer portion 13, the print layer 16, and an adhesive layer 81. The respective components of the IC key-chain item 90 are the same as those of the first embodiment described above, and thus descriptions thereof are omitted.

In the present embodiment, a material of an adhesive layer 91 is a transparent adhesive tape such as an OCA.

For example, the print layer 16 is printed in a surface of the concave layer portion 13 that is situated opposite to the concave portion 20.

The IC module 14 is accommodated in the concave portion 20 of the concave layer portion 13.

The lid portion 15 to which the adhesive layer 81 is attached is connected to the IC module 14.

The print portion 12 and the concave layer portion 13 are connected to each other in a state in which the adhesive layer 91 is arranged between the print portion 12 and the concave layer portion 13.

The top layer portion 11 to which the adhesive layer 81 is attached is connected to a surface of the concave layer portion 13 that is connected to the print portion 12.

Note that the method for producing the IC key-chain item 90 is not limited, and, for example, the order of the respective members is also not limited.

Note that a UV adhesive may be adopted as a material of the adhesive layer 81 used for the IC key-chain item 90 illustrated in FIGS. 12 and 13. In this case, the concave portion 20 accommodating therein the IC module 14 corresponds to a gap between the top layer portion 11 and the concave layer portion 13 when the top layer portion 11 is connected to a surface (the first concave-layer surface 19$a$) in which a concave portion is formed.

When there is a gap such as a concave portion between plate members that are bonded to each other, as described above, the air in the gap may be pushed into a space between the plate members to generate air bubbles.

In the present embodiment, the lid portion 15 is arranged to cover a concave portion, as illustrated in FIGS. 12 and 13. This makes it possible to sufficiently prevent the air in a concave portion from escaping from the concave portion when the top layer portion 11 and the concave portion layer portion 13 are bonded to each other. This results in being able to sufficiently prevent air bubbles from being generated, and thus to provide the IC key-chain item 90 being capable of performing a contactless communication and having a high degree of merchantability.

Note that it is also possible to prevent air bubbles from being generated by adjusting an amount of UV applied and the duration of a UV effect when UV bonding is performed. Moreover, it is possible to prevent air bubbles from being generated by various methods such as adjusting the speed of a roller. For example, in the case of using an OCA, an OCA that has a thickness (about 175 μm) of about three times the thickness of a print layer is used, and bonding is performed at a constant high temperature by applying a roller rolling at a fixed speed from one side. Likewise, in the case of UV bonding, an amount of UV applied, the temperature, and the speed of a roller are controlled to perform bonding in a state in which no air bubbles are generated. The use of such a technology makes it possible to prevent air bubbles from being generated, and thus to provide the IC key-chain item 90 produced with a high design quality.

In the embodiment described above, the IC key-chain items 10, 70, 80, and 90 each have an appearance of an acrylic key-chain item. Without being limited thereto, an IC module may be provided inside any housing of, for example, a belt, a wristband, or a figure. Further, the IC module of each of the IC key-chain items 10, 70, 80, and 90 may also be provided outside of the housing.

In the embodiments described above, the IC key-chain items 10, 70, 80, and 90 each have an appearance of a transparent acrylic key-chain item. Without being limited thereto, the IC key-chain items 10, 70, 80, and 90 may each have any shape and any color in appearance. For example, when a picture of a dolphin is printed in the print portion 12, a coating or a material such that the top layer portion 11 or the concave layer portion 13 has a transparent blue color obtained by mimicking the color of the sea.

In the embodiments described above, the print layer 16 is a member that indicates a position used as a reference when a contactless communication is performed by the IC module 14, and is arranged to hide the IC module 14. Without being limited thereto, a component used to hide the IC module 14 may be formed. For example, a print layer in which a back surface or the like such as the back of a character is printed may be arranged between the through-hole portion 72 and the second connection surface 74 of the cover portion 71.

In the embodiments described above, a character and the like are printed in the transparent film 28 or a white film 30. Without being limited thereto, a character and the like may be printed in the top layer portion 11 or the concave layer portion 13. For example, a character and the like may be printed in the first connection surface 73 connected to the through-hole portion 72 of the cover portion 71.

In the embodiments described above, the IC key-chain items 10, 70, 80, and 90 each have a fixed thickness. Without being limited thereto, the IC key-chain items 10, 70, 80, and 90 may be formed to have any thickness in a range in which the communication performance achieved when the IC key-chain items 10, 70, 80, and 90 are formed is maintained. For example, the thicknesses of the IC key-chain items 10, 70, 80, and 90 may be set as appropriate to, for example, a tolerance of +/−10%.

In the embodiments described above, the top layer portion 11, the concave layer portion 13, and the lid portion 15 are formed using one type of material such as PMMA. Without being limited thereto, the components respectively made of transparent resin materials such as an acrylic resin and polycarbonate may be combined. For example, the top layer portion 11 may be made of an acrylic resin, and the concave layer portion 13 may be made of polycarbonate.

In the embodiments described above, a UV adhesive or an acrylic pressure-sensitive adhesive is used for the adhesive layer 25. Without being limited thereto, the method for connecting the respective components may be adopted discretionarily. For example, the respective components may be connected to each other using a welding method such as ultrasonic welding, laser welding, or heat welding.

In the embodiments described above, the IC module 14 is internally included in each of the IC key-chain items 10, 70, 80, and 90. Without being limited thereto, the IC module 14 may be connected to the outside of each of the IC key-chain item 10, 70, 80, and 90, or an antenna or the like of the IC module 14 may be connected to the outside of the IC key-chain item 10.

In the embodiments described above, each of the IC key-chain items 10, 70, 80, and 90 includes two PMMA plates that are the top layer portion 11 and the concave layer portion 13, or three PMMA plates that are the top layer portion 11, the cover portion 71, and the through-hole portion 72. Without being limited thereto, the number of plates included in each of the IC key-chain items 10, 70, 80, and 90 is not limited. For example, the configuration may be changed as appropriate in order to include a function other than the IC module 14.

The respective configurations of the IC key-chain items, the top layer portion, the concave layer portion, the lid portion, the through-hole portion, and the like; the methods for producing the IC key-chain items; and the like described with reference to the respective figures are merely embodiments, and any modifications may be made thereto without departing from the spirit of the present technology. In other words, for example, any other configurations and any other production methods for purpose of practicing the present technology may be adopted.

In the present disclosure, expressions, such as "center", "middle", "uniform", "equal", "same", "orthogonal", "parallel", "symmetrical", "extend", "axial direction", "circularly cylindrical", "cylindrical", "ring-shaped", and "annular", that define, for example, a shape, a size, a positional relationship, and a state respectively include, in concept, expressions such as "substantially the center/substantial center", "substantially the middle/substantially middle", "substantially uniform", "substantially equal", "substantially the same", "substantially orthogonal", "substantially parallel", "substantially symmetrical", "substantially extend", "substantially axial direction", "substantially circularly cylindrical", "substantially cylindrical", "substantially ring-shaped", and "substantially annular".

For example, the expressions such as "center", "middle", "uniform", "equal", "same", "orthogonal", "parallel", "symmetrical", "extend", "axial direction", "circularly cylindrical", "cylindrical", "ring-shaped", and "annular" also respectively include states within specified ranges (such as a range of +/−10%), with expressions such as "exactly the center/exact center", "exactly the middle/exactly middle", "exactly uniform", "exactly equal, "exactly the same", "completely orthogonal", "completely parallel", "completely symmetrical", "completely extend", "fully axial direction", "perfectly circularly cylindrical", "perfectly cylindrical", "perfectly ring-shaped", and "perfectly annular" being respectively used as references.

At least two of the features of the present technology described above can also be combined. In other words, the various features described in the respective embodiments may be combined discretionarily regardless of the embodiments. Further, the various effects described above are not limitative but are merely illustrative, and other effects may be provided.

Note that the present technology may also take the following configurations.

(1) A contactless communication medium, including:
an integrated circuit (IC) module used to perform a contactless communication;
a first member that is made of a first transparent resin material, the first member including a first surface and a second surface, the first surface being a surface in which a concave portion that accommodates therein the IC module is formed, the second surface being situated opposite to the first surface;
a second member that is made of a second transparent resin material, the second member being connected to the first surface or the second surface; and
a print layer that is arranged between the first member and the second member.

(2) The contactless communication medium according to (1), further including
a lid member that is arranged to cover the concave portion accommodating therein the IC module.

(3) The contactless communication medium according to (2), in which
the lid member includes a plurality of recesses having different shapes.

(4) The contactless communication medium according to any one of (1) to (3), in which
the first transparent resin material is an acrylic resin or polycarbonate, and
the second transparent resin material is an acrylic resin or polycarbonate.

(5) The contactless communication medium according to (2), in which
the first transparent resin material and the second transparent resin material are the same material.

(6) The contactless communication medium according to any one of (1) to (5), in which
the contactless communication medium has a plate shape having a uniform thickness, and
the first member and the second member are connected to each other in a direction of the thickness.

(7) The contactless communication medium according to any one of (1) to (6), in which
the first member includes a first separate member and a second separate member, the first separate member being a member in which a through-hole is formed, the second separate member being connected to the first separate member to cover one of openings of the through-hole, and
the concave portion is the through-hole of which the one of the openings is covered.

(8) The contactless communication medium according to (6), further including
a lid member that is arranged to cover the concave portion accommodating therein the IC module, and
the lid member is arranged to cover the entirety of the concave portion, as viewed from the direction of the thickness.

(9) The contactless communication medium according to any one of (2) to (8), in which
the lid member is arranged such that a surface of the lid member that is situated opposite to the IC module is situated in plane with the first surface of the first member.

(10) The contactless communication medium according to any one of (6) to (8), in which
the first member and the second member have the same shape, as viewed from the direction of the thickness.

(11) The contactless communication medium according to any one of (1) to (10), in which
the print layer is a layer in which at least one of a character, a word, a picture, a photo, or a figure is printed.

(12) The contactless communication medium according to any one of (6) to (11), in which
the print layer has a specified outer shape, as viewed from the direction of the thickness, and
the first member and the second member each have an outer shape based on an outer shape of the print layer, as viewed from the direction of the thickness.

(13) The contactless communication medium according to any one of (2) to (12), in which
the first member, the second member, the lid member, and the print layer are each connected to another member using UV bonding, bonding with a double-sided tape, ultrasonic welding, laser welding, or heat welding.

(14) The contactless communication medium according to (13), in which at least one of the first member, the second member, the lid member, or the print layer is connected to the other member using the UV bonding.

(15) The contactless communication medium according to any one of (1) to (14), in which the concave portion is formed on the basis of a specified reference position, and the contactless communication medium further includes a position display member that indicates the reference position.

(16) A method for producing a contactless communication medium, the method including:

forming a first member using a first transparent resin material, the first member including a first surface and a second surface, the first surface including a concave portion, the second surface being situated opposite to the first surface;

forming a second member using a second transparent resin material;

accommodating, in the concave portion, an integrated circuit (IC) module used to perform a contactless communication; and connecting the second member to the first surface or the second surface of the first member such that a print layer is arranged between the first member and the second member.

(17) A method for producing a contactless communication medium, the method including:

forming a first separate member using a first transparent resin material, the first separate member including a through-hole;

forming a second separate member using the first transparent resin material;

forming a first member by connecting the first separate member and the second separate member to cover one of openings of the through-hole, the first member including a first surface and a second surface, the first surface including a concave portion, the second surface being situated opposite to the first surface;

forming a second member using a second transparent resin material;

accommodating, in the concave portion, an integrated circuit (IC) module used to perform a contactless communication; and connecting the second member to the first surface or the second surface of the first member such that a print layer is arranged between the first member and the second member.

(18) A method for producing a contactless communication medium, the method including:

forming a first transparent member using a first transparent resin material, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

(19) A method for producing a contactless communication medium, the method including:

forming a first separate member using a first transparent resin material, the first separate member including a plurality of through-holes;

forming a second separate member using the first transparent resin material;

forming a first transparent member by connecting the first separate member and the second separate member to cover respective openings of the plurality of through-holes that are situated on the same side, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

(20) The method for producing a contactless communication medium according to (18) or (19), in which the cutting out the portion including each of the plurality of concave portions such that the portion has the specified shape is performed by laser processing or cutting processing.

(21) The contactless communication medium according to any one of (1) to (15), in which the first member, the second member, the lid member, or the print layer are each connected to the other member using the UV bonding.

REFERENCE SIGNS LIST 7 first primary surface
8 second primary surface
10 IC key-chain item
11 top layer portion
12 print portion
13 concave layer portion
14 IC module
15 lid portion
16 print layer
20 concave portion
25 adhesive layer
29 print layer
70 IC key-chain item
71 cover portion
72 through-hole portion
75 through-hole
80 IC key-chain item
90 IC key-chain item
100 communication system

The invention claimed is:
1. A contactless communication medium, comprising:
an integrated circuit (IC) module used to perform a contactless communication;

a first member that is made of a first transparent resin material, the first member including a first surface and a second surface, the first surface being a surface in which a concave portion that accommodates therein the IC module is formed, the second surface being situated opposite to the first surface;

a second member that is made of a second transparent resin material, the second member being connected to the first surface or the second surface;

a print layer that is arranged between the first member and the second member; and a lid member that is arranged to cover the concave portion accommodating therein the IC module.

2. The contactless communication medium according to claim 1, wherein
the lid member includes a plurality of recesses having different shapes.

3. The contactless communication medium according to claim 1, wherein
the first transparent resin material is an acrylic resin or polycarbonate, and
the second transparent resin material is the acrylic resin or polycarbonate.

4. The contactless communication medium according to claim 1, wherein
the first transparent resin material and the second transparent resin material are the same material.

5. The contactless communication medium according to claim 1, wherein
the contactless communication medium has a plate shape having a uniform thickness, and
the first member and the second member are connected to each other in a direction of the uniform thickness.

6. The contactless communication medium according to claim 5, wherein
the lid member is arranged to cover the entirety of the concave portion, as viewed from the direction of the uniform thickness.

7. The contactless communication medium according to claim 5, wherein
the first member and the second member have the same shape, as viewed from the direction of the uniform thickness.

8. The contactless communication medium according to claim 5, wherein
the print layer has a specified outer shape, as viewed from the direction of the uniform thickness, and
the first member and the second member each have an outer shape based on the specified outer shape of the print layer, as viewed from the direction of the uniform thickness.

9. The contactless communication medium according to claim 1, wherein
the first member includes a first separate member and a second separate member, the first separate member being a member in which a through-hole is formed, the second separate member being connected to the first separate member to cover one of openings of the through-hole, and
the concave portion is the through-hole of which the one of the openings is covered.

10. The contactless communication medium according to claim 1, wherein
the lid member is arranged such that a surface of the lid member that is situated opposite to the IC module is situated in plane with the first surface of the first member.

11. The contactless communication medium according to claim 1, wherein
the print layer is a layer in which at least one of a character, a word, a picture, a photo, or a figure is printed.

12. The contactless communication medium according to claim 1, wherein
the first member, the second member, the lid member, and the print layer are each connected to another member using one of UV bonding, bonding with a double-sided tape, ultrasonic welding, laser welding, or heat welding.

13. The contactless communication medium according to claim 12, wherein
at least one of the first member, the second member, the lid member, or the print layer is connected to the another member using the UV bonding.

14. The contactless communication medium according to claim 1, wherein
the concave portion is formed on a basis of a specified reference position, and
the contactless communication medium further comprises a position display member that indicates the specified reference position.

15. A method for producing a contactless communication medium, the method comprising:
forming a first member using a first transparent resin material, the first member including a first surface and a second surface, the first surface including a concave portion, the second surface being situated opposite to the first surface;
forming a second member using a second transparent resin material;
accommodating, in the concave portion, an integrated circuit (IC) module used to perform a contactless communication;
connecting the second member to the first surface or the second surface of the first member such that a print layer is arranged between the first member and the second member; and
arranging a lid member to cover the concave portion accommodating therein the IC module.

16. A method for producing a contactless communication medium, the method comprising:
forming a first separate member using a first transparent resin material, the first separate member including a through-hole;
forming a second separate member using the first transparent resin material;
forming a first member by connecting the first separate member and the second separate member to cover one of openings of the through-hole, the first member including a first surface and a second surface, the first surface including a concave portion, the second surface being situated opposite to the first surface;
forming a second member using a second transparent resin material;
accommodating, in the concave portion, an integrated circuit (IC) module used to perform a contactless communication; and
connecting the second member to the first surface or the second surface of the first member such that a print layer is arranged between the first member and the second member.

17. A method for producing a contactless communication medium, the method comprising:

forming a first transparent member using a first transparent resin material, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

18. The method for producing the contactless communication medium according to claim 17, wherein the cutting out the portion including each of the plurality of concave portions such that the portion has the specified shape is performed by laser processing or cutting processing.

19. A method for producing a contactless communication medium, the method comprising:

forming a first separate member using a first transparent resin material, the first separate member including a plurality of through-holes;

forming a second separate member using the first transparent resin material;

forming a first transparent member by connecting the first separate member and the second separate member to cover respective openings of the plurality of through-holes that are situated on the same side, the first transparent member including a first surface and a second surface, the first surface including a plurality of concave portions, the second surface being situated opposite to the first surface;

forming a second transparent member using a second transparent resin material;

accommodating, in each of the plurality of concave portions, an integrated circuit (IC) module used to perform a contactless communication;

connecting the second transparent member to the first surface or the second surface of the first transparent member such that a print layer is arranged between the first transparent member and the second transparent member; and cutting out a portion that includes each of the plurality of concave portions each accommodating therein the IC module, such that the portion has a specified shape.

* * * * *